United States Patent
Iso et al.

(10) Patent No.: US 11,154,809 B2
(45) Date of Patent: Oct. 26, 2021

(54) PACKING, METHOD FOR MANUFACTURING SAME, AND LIQUID FILM-FORMING STRUCTURE

(71) Applicants: IHI Corporation, Koto-ku (JP); University Public Corporation Osaka, Osaka (JP)

(72) Inventors: Yoshiyuki Iso, Tokyo (JP); Ryosuke Ikeda, Tokyo (JP); Kenji Takano, Tokyo (JP); Kenji Katoh, Osaka (JP); Tatsuro Wakimoto, Osaka (JP)

(73) Assignees: IHI Corporation, Koto-ku (JP); University Public Corporation Osaka, Osaka (JP)

( * ) Notice: Subject to any disclaimer, the term of this patent is extended or adjusted under 35 U.S.C. 154(b) by 0 days.

(21) Appl. No.: 16/937,669

(22) Filed: Jul. 24, 2020

(65) Prior Publication Data

US 2020/0353405 A1 Nov. 12, 2020

Related U.S. Application Data

(63) Continuation of application No. PCT/JP2019/002933, filed on Jan. 29, 2019.

(30) Foreign Application Priority Data

Jan. 30, 2018 (JP) .............................. JP2018-013603

(51) Int. Cl.
*B01D 53/18* (2006.01)
*B01F 3/04* (2006.01)
*B01J 19/32* (2006.01)

(52) U.S. Cl.
CPC .......... *B01D 53/18* (2013.01); *B01F 3/04078* (2013.01); *B01F 3/04475* (2013.01);
(Continued)

(58) Field of Classification Search
CPC .... B01F 3/04; B01F 3/04078; B01F 3/04475; B01F 3/04489; B01D 53/18; B01J 19/32
See application file for complete search history.

(56) References Cited

U.S. PATENT DOCUMENTS 5,063,000 A * 11/1991 Mix .......................... B01J 19/32
                                                                 261/94
5,089,137 A    2/1992 McKown
(Continued)

FOREIGN PATENT DOCUMENTS

EP    3 225 304 A1    10/2017
FR    2.203.671       10/1973
(Continued)

OTHER PUBLICATIONS

International Search Report dated Mar. 26, 2019 in PCT/JP2019/002933 filed on Jan. 29, 2019, 2 pages.
(Continued)

*Primary Examiner* — Robert A Hopkins
(74) *Attorney, Agent, or Firm* — Oblon, McClelland, Maier & Neustadt, L.L.P.

(57) ABSTRACT

A packing for gas-liquid contact has at least one packing element of a thin layer shape, placed in a standing position. The packing element has a main body portion having a planar liquid film-forming surface extending along a liquid flow direction, and at least one wall portion provided to stand relative to the liquid film-forming surface and extending along the liquid flow direction. The wall portion has a side surface inclined at a predetermined angle to the liquid film-forming surface in a surface position of a liquid film to be formed by a liquid on the liquid film-forming surface.

20 Claims, 11 Drawing Sheets

(52) U.S. Cl.
CPC .......... *B01F 3/04489* (2013.01); *B01J 19/32*
(2013.01); *B01J 2219/3221* (2013.01); *B01J*
*2219/32227* (2013.01)

(56) References Cited

U.S. PATENT DOCUMENTS

| | | |
|---|---|---|
| 5,536,454 A | 7/1996 | Fujii et al. |
| 6,565,629 B1 | 5/2003 | Hayashida et al. |
| 2002/0157537 A1 | 10/2002 | Hayashida et al. |
| 2017/0014797 A1 | 1/2017 | Iso et al. |
| 2018/0207544 A1 | 7/2018 | Iso et al. |
| 2019/0193015 A1 | 7/2019 | Iso et al. |

FOREIGN PATENT DOCUMENTS

| | | |
|---|---|---|
| JP | 06-210121 A | 8/1994 |
| JP | 06-269627 A | 9/1994 |
| JP | 06-269628 A | 9/1994 |
| JP | 06-269629 A | 9/1994 |
| JP | 07-121357 B2 | 12/1995 |
| JP | 08-168670 A | 7/1996 |
| JP | 2000-249464 A | 9/2000 |
| JP | 2010-062111 A | 3/2010 |
| JP | WO2018/025757 A1 | 2/2018 |
| WO | WO 2017/057118 A1 | 4/2017 |

OTHER PUBLICATIONS

European Search Report issued in European Patent Application No. dated Aug. 13. 2021.

\* cited by examiner

PACKING, METHOD FOR MANUFACTURING SAME, AND LIQUID FILM-FORMING STRUCTURE

CROSS REFERENCE TO RELATED APPLICATIONS

This application is a continuation application of International Application No. PCT/JP2019/002933, filed on Jan. 29, 2019, which claims priority of Japanese Patent Application No. 2018-013603, filed on Jan. 30, 2018, the entire contents of which are incorporated by reference herein.

BACKGROUND

Technical Field

The present disclosure relates to a packing for promoting mass transfer between gas and liquid in gas-liquid contact, a method for manufacturing the same, and a liquid film-forming structure.

Description of the Related Art

Conventionally, a gas separation apparatus employing gas-liquid contact is used in chemical plants, thermal power plants and the like, to separate, remove or recover a specific gas from a gas to be treated, containing various kinds of gases, such as an exhaust gas. For example, in a carbon-dioxide recovering apparatus, a gas containing carbon dioxide gets into contact with an absorbent such as an aqueous monoethanolamine solution, so that carbon dioxide is absorbed and separated. The absorbent that has absorbed carbon dioxide comes into gas-liquid contact while being heated, thereby releasing carbon dioxide into a gas phase, which is recovered. In addition, in a gas purification apparatus for removing a harmful gas component from an exhaust gas and in a gas separation apparatus for separating a specific gas component from a mixed gas, a specific gas component is absorbed into an absorbent through gas-liquid contact.

Generally, an apparatus that performs gas-liquid contact has a packing for increasing the contact area between an absorbent and a gas, brings the absorbent and the gas into gas-liquid contact on the surface of the packing, and causes a specific gas component in the gas to be absorbed into the absorbent. Various forms have been proposed as specific embodiments of packing useful for increasing the gas-liquid contact area.

In a gas-liquid contact apparatus disclosed in Japanese Patent Application Laid-open No. H6-210121 (Publication Document 1 below), in order to increase gas-liquid contact area, the gas-liquid contact surface of the packing is formed of one of a rough surface portion having center line average roughness of 50 μm or more, a porous surface portion having a plurality of drilled holes, and a net-like object. In addition, in a gas-liquid contact apparatus disclosed in Japanese Patent Application Laid-open No. H6-269628 (Publication Document 2), the gas-liquid contact surface is composed of a material having a net-like body bonded to a surface of a sheet-like body. In a gas-liquid contact apparatus disclosed in Japanese Patent Publication No. H7-121357 (Publication Document 3), a gas-liquid contact portion is constituted of a gas-liquid contact unit in which a large number of three-dimensional knitted fabrics are arranged in a vertical or almost vertical direction.

In contrast, Japanese Patent Application Laid-open No. H6-269629 (Publication Document 4) discloses a gas-liquid contact apparatus in which a tubular structure having a horizontal cross-sectional shape of a circle, a semicircular arc, a spiral or the like is used as a packing material.

DOCUMENTS LIST

Publication Document 1: Japanese Patent Application Laid-open (JPA) No. H6-210121
Publication Document 2: Japanese Patent Application Laid-open (JPA) No. H6-269628
Publication Document 3: Japanese Patent Publication (JPB) No. H7-121357
Publication Document 4: Japanese Patent Application Laid-open (JPA) No. H6-269629

BRIEF SUMMARY

However, it takes time and labor to process the packing disclosed in each of the Publication Documents 1 to 3, and manufacturing cost of the packing is greatly increased. Particularly, since a net-like body such as wire gauze and three-dimensional knitted fabrics has insufficient strength and distortion of the shape thereof is easy, it is difficult to make the net-like body stand-alone. Therefore, a support member having strength is required when performing the treatment with the net-like body in a standing state, and thus weight increase due to it causes on the support structure of the packing, that leads to an increase in the weight and the size of the apparatus, increasing material costs and manufacturing costs.

In addition, in a structure in which a flow path of a gas flowing in a packing has a complicated shape, the packing hinders the gas flow and pressure loss increases, resulting in lowering of energy efficiency in gas supply. In order to improve the energy efficiency in gas supply, the gas flow is preferably close to a straight line. In this respect, the packing material disclosed in the Publication Document 4 has a vertical gas-liquid contact surface, and flow resistance of a gas is small. However, with the structure disclosed in this document, it is difficult to supply the liquid accurately to the entire packing and it tends to be uneven supply. Therefore, the absorbing liquid flowing down the packing may concentrate locally, and increasing gas-liquid contact area is unexpectedly difficult. In addition, the structure is not very high in uniformity in space utilization, and there is little room for improvement even in the gas-liquid contact area per filling volume.

In order to keep low the energy consumed during operation, it is necessary to suppress pressure loss due to flow resistance of the gas. For that purpose, it is desirable to use a packing in which sheet materials (thin-layer materials) are arranged in parallel to pass the gas through them. Manufacturing and processing costs of the packing with such a structure is also possible to decrease. However, even in this case, if attaching a reinforcing material for convenience of material selection and structural design, it is necessary to resolve the problem of a decrease in the gas-liquid contact surface area and the problem caused in wetting by a liquid, caused due to presence of the reinforcing material.

The present disclosure has come to create in view of the above-described problems. An object of the present disclosure is to provide a packing for gas-liquid contact and a manufacturing method therefor, capable of realizing preferable gas-liquid contact and efficient component transfer, with suppressing pressure loss in gas-liquid contact while eliminating wetting inhibition caused by the structure.

According to an aspect of the present disclosure, a packing for gas-liquid contact has at least one packing element of a thin layer shape that is placed in a standing position, and the packing element of the thin layer shape comprises: a main body portion having a planar liquid film-forming surface extending along a liquid flow direction; and at least one wall portion that is provided to stand relative to the liquid film-forming surface and extending along the liquid flow direction, wherein the wall portion has a side surface which has an inclined surface inclined at a predetermined angle to the liquid film-forming surface in a surface position of a liquid film to be formed by a liquid on the liquid film-forming surface.

The inclined surface may be a convex curved surface or an inclined plane surface, and the side surface of the wall portion may be discontinuous with the liquid film-forming surface. Moreover, the predetermined angle is an angle in a range including a receding contact angle to be formed by the liquid to the side surface. At the predetermined angle, the critical Weber number in the liquid film to be formed by the liquid on the liquid film-forming surface may be a value of 1 to 10 times the theoretical value. The predetermined angle may be 0.8 to 3.0 times a receding contact angle to be formed by the liquid to the side surface.

The inclined surface may be a convex curved surface that includes a partial surface of any one of cylindrical surfaces, oval cylindrical surfaces and elliptic cylindrical surfaces. The convex curved surface may include a partial cylindrical surface, and, at a curvature radius of the cylindrical surface, the critical Weber number in the liquid film to be formed by the liquid on the liquid film-forming surface may be a value of 1 to 10 times the theoretical value.

When the wall portion has a height exceeding a surface of the liquid film to be formed by the liquid, with reference to the liquid film-forming surface, it is useful as a spacer. The wall portion has a side surface including an extended surface that extends while being connected to the inclined surface. The packing element may be configured to have a pair of the wall portions, and the pair of the wall portions may extend at both side ends of the liquid film-forming surface.

Moreover, according to an aspect of the present disclosure, a method for manufacturing a packing having at least one packing element of a thin layer shape that is to be used by placing in a standing position, comprises: a designing step of designing a packing element of the thin layer shape comprising: a main body portion having a planar liquid film-forming surface; and at least one wall portion that is provided to stand relative to the liquid film-forming surface along a straight line, wherein the wall portion is designed to have a side surface which has an inclined surface inclined at a predetermined angle to the liquid film-forming surface in a surface position of a liquid film to be formed by a liquid on the liquid film-forming surface; and a fabricating step of fabricating the designed packing element of the thin layer shape, using a raw material.

Additionally, according to an aspect of the present disclosure, a liquid film-forming structure for forming a liquid film by a liquid to be supplied, comprises: a main body portion having a planar liquid film-forming surface; and at least one wall portion that is provided to stand relative to the liquid film-forming surface, wherein the wall portion has a side surface which has an inclined surface inclined at a predetermined angle to the liquid film-forming surface in a surface position of the liquid film to be formed by the liquid on the liquid film-forming surface.

It is possible to obtain a packing for gas-liquid contact, capable of suppressing pressure loss in gas-liquid contact while realizing preferable gas-liquid contact and efficient component transfer, and it becomes possible to provide a gas-liquid contact apparatus having good energy efficiency during operation.

DETAILED DESCRIPTION OF EMBODIMENTS

Figure 1:
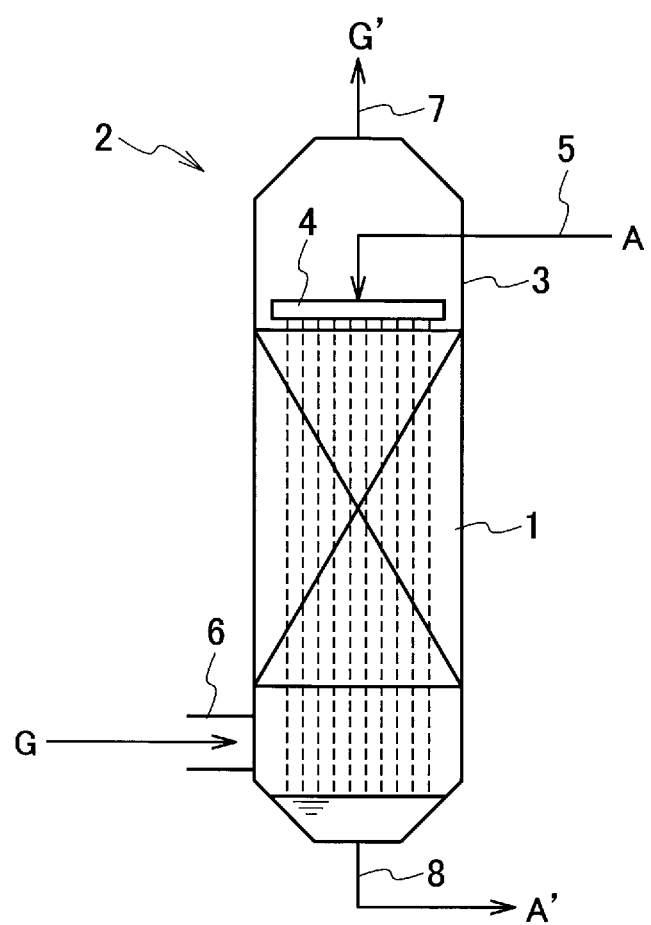
FIG. 1 is a schematic configuration diagram illustrating one embodiment of a gas-liquid contact apparatus in which a packing is used.

Description for embodiments of the present disclosure will follow, with reference to the accompanying drawings. Note that dimensions, materials, concrete numerical values and the like indicated in the embodiments are only examples for facilitating understanding the contents of the present disclosure and do not limit the present disclosure unless otherwise noted. Moreover, in the description and the drawings of the present disclosure, elements having substantially an identical function and configuration are shown with denoted by identical reference numerals, and overlapped description will be omitted. Elements not directly related to the present disclosure are not illustrated.

A gas-liquid contact apparatus using a packing for gas-liquid contact can be schematically described, for example, as shown in FIG. 1. The packing 1 using flat plate materials F is loaded in a container 3 of the gas-liquid contact apparatus 2 and can be used as a packing for gas-liquid contact. A liquid A is supplied to a spray pipe 4 through a liquid supply line 5 in order to disperse the liquid A to the packing 1 from the spray pipe 4 disposed above the packing 1. Supplying a gas G to the gas-liquid contact apparatus 2 through a gas supply line 6, the liquid flows down on the flat plate materials F of the packing 1 along the flat plane and contacts the rising gas G. During this gas-liquid contact, the liquid forms a liquid film on the packing 1 and, for example, absorbs a specific component of the gas G. The gas G' from which the specific component has been removed is discharged to the outside through a gas discharge line 7 connected to the top of the container 3. The liquid A' that has functioned for an absorbing liquid is stored in the bottom portion of the container 3 and then discharged to the outside through a drain line 8 connected to the bottom portion. For the packing 1, rectangular flat plate materials placed in a standing position are used, and the flow paths of the gas G and the liquid A in the packing 1, in the gas-liquid contact apparatus 2, are straight and simple gaps of a thin layer shape which are between the flat plate materials arranged in parallel at predetermined intervals. Therefore, the flow resistance is small and decrease in the manufacturing and processing costs is possible. Moreover, it is possible to control the gas flow rate by appropriately adjusting the interval between the plate materials.

Flow resistance of the gas when the gas comes to contact with the liquid affects the energy consumption during operation. In order to reduce operating costs, it is effective to use such a plurality of plate materials arranged in parallel to configure the packing. However, as the plate material is prepared thinner in order to increase the gas-liquid contact area per volume, the strength lowers and deformation and deflection are more likely to occur. The packing is required to have durability against the weight and the load of falling energy of the liquid supplied thereto. In addition, in the case of a multistage apparatus or a large-sized apparatus, durability against the weight loaded thereon and strength against the load assumed to take place during assembling work of the apparatus are also required. Therefore, even though the plate material can satisfactorily maintain a self-standing state in the vertical direction, the plate material may be required to have structural reinforcing so that the plate material can withstand the loads during operation and assembly.

Figure 2A:
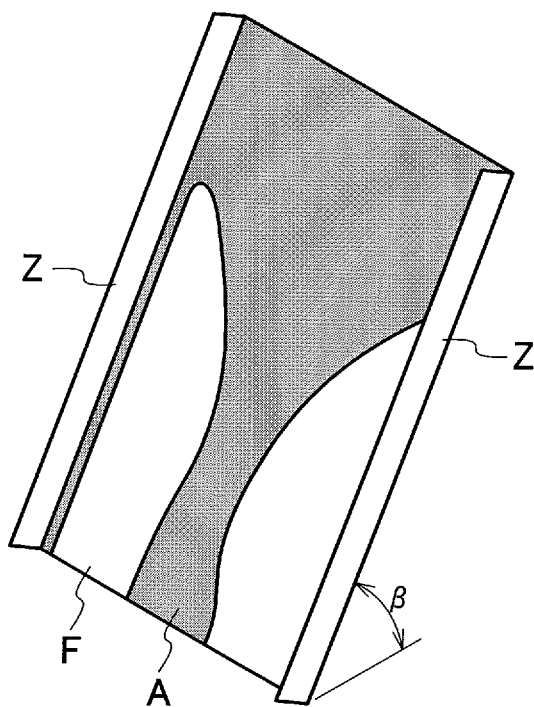
FIG. 2A is a schematic diagram illustrating a liquid flow analysis on a plate material constituting the packing.

Prevention of deformation and deflection of the plate material is possible by attaching a reinforcing material extending along the direction of liquid flow. For example, as shown in FIG. 2A, ribs Z perpendicular to the wetted surface (liquid film-forming surface) of the flat plate material F are provided to stand on the both side ends of the flat plate material F along the liquid flow direction as a reinforcing material. Then they improve the strength of the flat plate material F in the liquid flow direction to suppress deflection and deformation. At the same time, they also serve as a spacer for holding the interval among the plurality of flat plate materials F. However, there is a concern that existence of the reinforcing member may cause not only loss of the wetted area in the part to which the reinforcing material is attached but also reduction in the wetted area due to the influence on the liquid film around it. Specifically, the liquid film formed by the liquid A flowing down over the surface of the plate material breaks in the vicinity of the reinforcing material as shown in FIG. 2A, and the flow of the liquid converges, thereby it concentrates and flows locally. Thus, a phenomenon (dry out) occurs in which a part of the liquid film-forming surface extending in the liquid flow direction comes to no formation of liquid film. When the liquid film breaks, not only the wetted area (gas-liquid contact area) decreases but also the flow rate of the liquid A increases and the time that the liquid stays on the surface of the packing becomes short. That is, the gas-liquid contact efficiency, i.e. the absorption efficiency significantly decreases. Therefore, in the reinforcement, it is useful to configure such a form as to suppress the influence on the liquid film formation as much as possible.

Figure 2B:
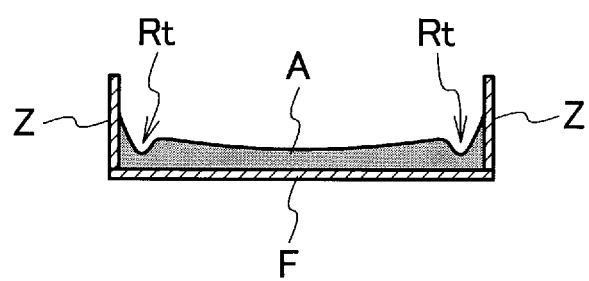
FIG. 2B is a horizontal cross-sectional view to the flow direction, for explaining a liquid film formed on the plate material of FIG. 2A.

In the formation of the liquid film as shown in FIG. 2A, tension acts in the directions along the surfaces of both the flat plate material F and the ribs Z due to the wettability of those members. Then the liquid film forms a meniscus (curvature of the liquid film surface) near the ribs Z. At this time, the surface of the liquid film has a shape in which a minimized region Rt that the thickness of the liquid film is locally minimized, as shown in FIG. 2B, appears near the ribs Z. When the occurrence of the minimized region Rt becomes significant, the liquid film breaks and the dry out occurs. In other words, if conditions are found to allow formation of a liquid film so that the minimized region Rt does not appear, it is possible to provide a packing in which dry out is suppressed during formation of the liquid film and gas-liquid contact is performed satisfactorily.

The meniscus phenomenon mainly changes with the three-phase contact angle of solid-gas-liquid, and the physical properties of the liquid, the state of the solid surface and the like are influence factors. That is, formation of the liquid film varies depending on the physical properties of the liquid and the solid-liquid contact conditions. Therefore, in regard to a packing element having a main body portion having a planar liquid film-forming surface (of a thin layer shape) and at least one wall portion standing on the liquid film-forming surface along a linear direction, the inventors have researched the surface shape of the liquid film formed in a state where the liquid flows on the liquid film-forming surface along the wall portion. Then, as a result of studying the factors that affect liquid film formation, they have already found a structure in which the side surface of the wall portion is curved concavely so as to be continuous with the liquid film-forming surface at the base (Reference: PCT International Publication No. WO2018/025557A1). However, further study has resulted in finding a new from, in addition to the above-described structure, which can suppress the formation of a meniscus to prevent liquid film breakage. That is, even when the side surface of the wall portion is discontinuous with the liquid film-forming surface, there can be a structure capable of preventing the liquid film from breaking. The present disclosure presents a structure of the packing element having a side surface of the wall portion that is discontinuous with the liquid film-forming surface, which is optimized so that the liquid film breakage is possibly prevented. The details will be described below.

The surface shape of the liquid film formed by the liquid on the liquid film-forming surface is affected by the wettability of the liquid to the side surface of the wall portion near the side surface of the wall portion, and the surface of the liquid film that contacts the side surface of the wall portion forms a receding contact angle with the side surface. Therefore, if the surface of the liquid film can maintain a flat state (parallel to the liquid film-forming surface) while forming a receding contact angle with respect to the side surface, it can be considered that the meniscus on the liquid film surface is least likely to occur. That is, the side surface of the wall portion at the surface position (liquid film height) of the liquid film may be an inclined surface having an inclination angle θ (an angle with respect to the liquid film-forming surface, see FIG. 3) corresponding to the receding contact angle $θ_R$ of the liquid. If so, the surface of the liquid film is kept in a horizontal state on the liquid film-forming surface and the formation of a meniscus is suppressed. Based on the geometric relationship between the side surface of the wall portion and the liquid film surface as mentioned above, the following items are derived.

First, based on the above-described geometric relationship, there has been obtained the optimum curvature radius Rs in the form in which the side surface of the wall portion is formed in a concave curved surface (a partial cylindrical surface, or, a part of a cylindrical surface) already presented, such as to have the side surface inclined as described above. The optimum value Rc of the curvature radius Rs can be expressed as in the following formula (1) based on the above-described geometric relationship between the side surface of the wall portion and the surface of the liquid film. It is possible to represent by the receding contact angle $θ_R$ of the liquid and the liquid film thickness δc under the critical condition. The critical condition is a condition under which the Weber number becomes a minimum value (critical Weber number). On a concave curved surface having a curvature radius of the optimum value Rc, if the liquid film is formed with a thickness equal to or greater than the liquid film thickness δc, the minimized region Rt disappears and the formation of a meniscus is suppressed. By setting the curvature radius within a suitable range including the optimum value to form the concave curved surface, it is possible to suppress breakage of the liquid film.

$$Rc = δc/(1-\cos θ_R) \quad (1)$$

Furthermore, based on the above-described geometric relationship, it is possible to present, as a new form in which the side surface of the wall portion has a shape other than the concave curved surface, a form in which the side surface of the wall portion has an inclined surface that is discontinuous with the liquid film-forming surface. This includes a style in which the inclined surface is a plane and a style in which the inclined surface is a convex curved surface. Also in these cases, the optimum conditions can be set, and the structure of the wall portion can be determined that can suppress the liquid film breakage.

Figure 3:
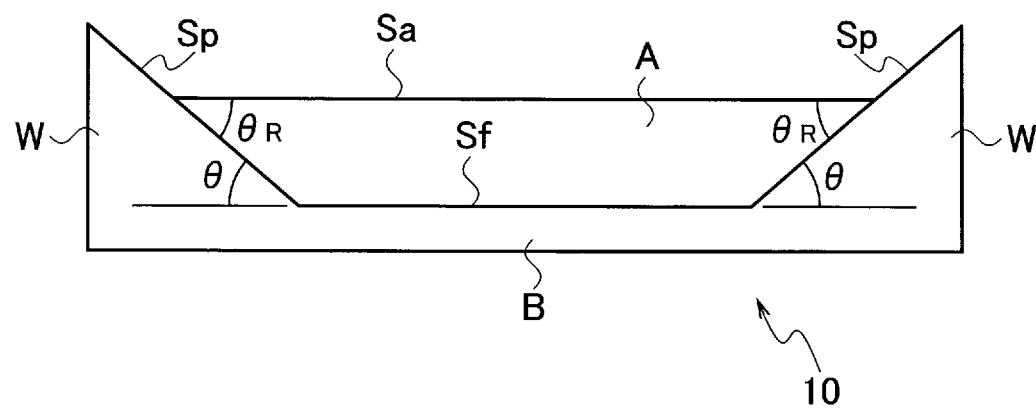
FIG. 3 is a cross-sectional view for explaining a basic embodiment of a packing element constituting the packing.

A form in which the side surface of the wall portion has a planar inclined surface can be represented, for example, as shown in FIG. 3. In FIG. 3, the packing element 10 has a thin layer-shaped main body portion B having a planar liquid film-forming surface Sf, and at least one wall portion W (in FIG. 3, a pair on both ends) that is provided to stand relative to the liquid film-forming surface Sf. The wall portion W is formed integrally with the main body portion B linearly along the liquid flow direction. The side surface of the wall portion W, that is, an inclined surface Sp is a plane surface inclined with respect to the liquid film-forming surface Sf. The inclination angle θ of the inclined surface Sp with respect to the liquid film-forming surface Sf corresponds to the receding contact angle $θ_R$ formed by the liquid with respect to the side surface. Note that the inclination angle is an exterior angle with respect to the inclined surface Sp and the liquid film-forming surface Sf, and is 0°<θ<90°. That is, the side surface of the wall portion, in the surface position of the liquid film, is inclined with respect to the liquid film-forming surface at an inclination angle θ corresponding to the receding contact angle $θ_R$ of the liquid. In this state, it is possible to keep flat the surface of the liquid film also near the side surface of the wall portion, as shown in FIG. 3, which is an optimum condition for suppressing the formation of a meniscus. Therefore, the optimum value of the inclination angle θ is the receding contact angle $θ_R$ of the liquid.

Figure 4:
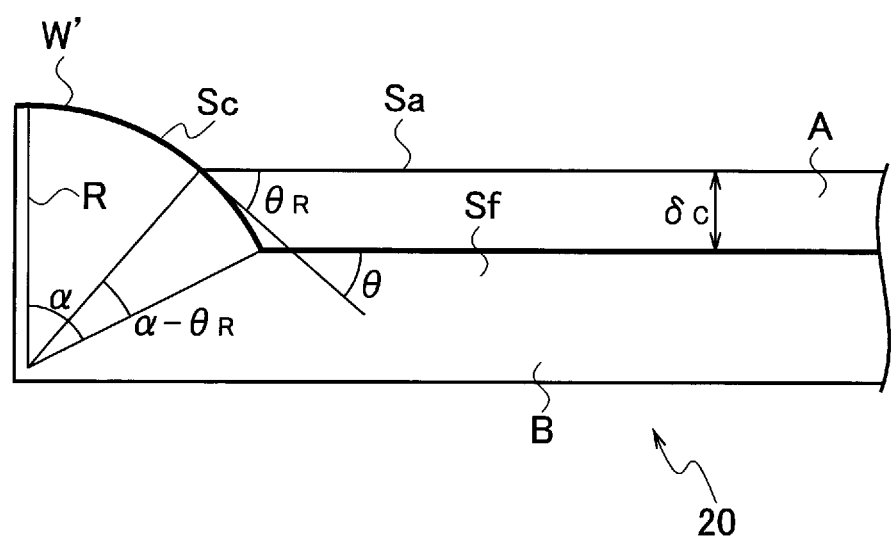
FIG. 4 is a cross-sectional view for explaining another basic embodiment of the packing element constituting the packing.

On the other hand, a form in which the side surface of the wall portion has a convexly curved inclined surface can be represented, for example, as shown in FIG. 4. In FIG. 4, the packing element 20 has a thin layer-shaped main body portion B having a planar liquid film-forming surface Sf, and at least one wall portion W' that is provided upright relative to the liquid film-forming surface Sf. FIG. 4 shows only one side end of the packing element 20. The wall portion W' is formed integrally with the main body portion B linearly along the liquid flow direction. The side surface of the wall portion W' is a convexly curved inclined surface Sc, and more specifically, is formed in a shape of partial cylindrical surface. Also in this case, by appropriately setting the curvature radius Rs of the inclined surface Sc, the inclined surface Sc at the surface position of the liquid film is inclined at an inclination angle θ corresponding to the receding contact angle $θ_R$ of the liquid with respect to the liquid film-forming surface Sf. That is, the side surface of the wall portion W' at the height of the liquid film functions similarly to the inclined surface Sp in FIG. 3. The optimum value Rc of the curvature radius Rs can be expressed by the following formula (2) based on the geometric relationship between the side surface of the wall portion and the surface of the liquid film. (In the formula, δc is the film thickness (the height of the liquid film) and a is the central angle of the partial cylindrical surface forming the side surface of the wall portion W'). Note that the optimum value Rc can be changed in accordance with setting the central angle α. If the central angle α is increased, the optimum value Rc of the curvature radius decreases. At the central angle α=90° (quarter columnar wall portion W'), the optimum value of the curvature radius Rc is δc/cos $θ_R$.

$$Rc = δc/(\cos θ_R - \cos α) \quad (2)$$

The critical Weber number in the liquid film decreases as the inclination angle θ of the above-mentioned inclined surface decreases from 90°, and it approaches the theoretical value (theoretical calculation value for a liquid film formed under the same conditions on the liquid film-forming surface without wall portions). Then it is substantially minimized when the inclination angle θ is the receding contact angle $θ_R$ of the liquid or a value close thereto (see FIG. 5 described later). The smaller the critical Weber number is, the easier it is to keep the liquid wetting preferable. Therefore, by setting the inclination angle θ so that the critical Weber number becomes small, it is easy to suppress the formation of a meniscus and breakage of the liquid film near the wall portion, and the optimum value of the inclination angle θ is the receding contact angle $θ_R$ of the liquid. Since the receding contact angle $θ_R$ differs depending on the type of liquid, the material constituting the side surface of the wall portion, and the surface condition, the optimum value of the inclination angle θ differs depending on the liquid to use. Therefore, the inclination angle θ of the inclined surface may be appropriately set based on the liquid to use. However, the inclination angle θ does not have to be an optimum value. If the inclination angle θ is an angle within a certain range encompassing the receding contact angle $θ_R$, the critical Weber number becomes a value close to the minimum value and it is effective for suppressing meniscus.

This range can be determined based on the liquid used and the condition of the side surface of the wall portion. Generally, it is appropriate to set the inclination angle θ such that the critical Weber number is in the range of approximately 1 to 10 times, preferably about 1 to 5 times, more preferably about 1 to 3 times the theoretical value. Based on this, the inclination angle θ (0°<θ<90°) can be generally set at about 3.0 times or less the receding contact angle $θ_R$. Therefore, a range of about 0.8 to 3.0 times, preferably about 0.8 to 2.5 times, more preferably about to 0.8 to 2.0 times the receding contact angle can be set as that for the predetermined angle. However, the receding contact angle of the liquid is not so large in the use as a packing, and, when the inclination angle θ is smaller than the receding contact angle $θ_R$, the side surface of the wall portion is close to the state of coincidence with the liquid film-forming surface. Although this is not a problem in terms of forming a liquid film, the reinforcing function as a rib is lost and use as a spacer becomes difficult. Therefore, taking into account the above-mentioned preferred range, it can be said as being practical to set the inclination angle θ within the range of the receding contact angle $θ_R$ or more and less than 90°.

Figure 5:
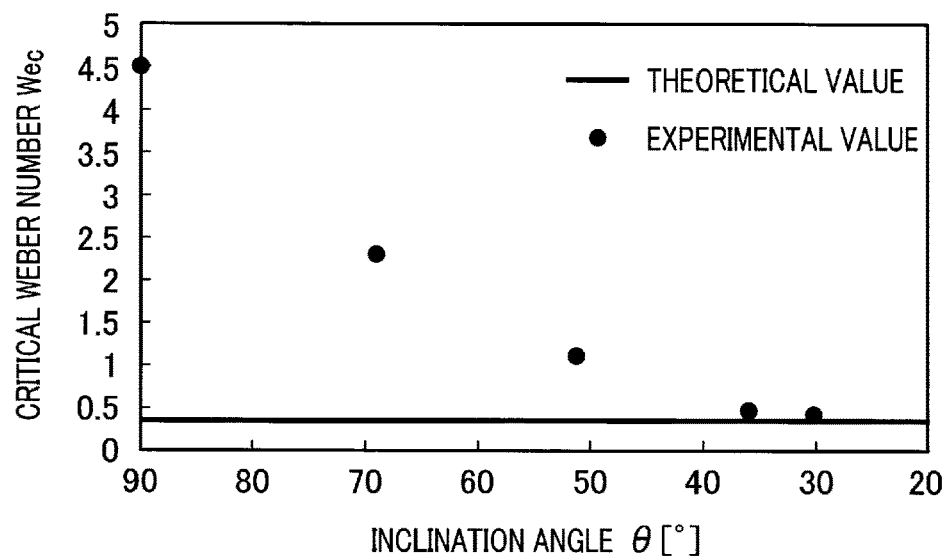
FIG. 5 is a graph illustrating a correlation between the inclination angle θ of a side surface of a wall portion of the packing element and a critical Weber number $We_c$.

FIG. 5 is a graph showing the relationship between the inclination angle θ and the critical Weber number. This graph is created based on the measurement result of the packing element in which the side surface of the wall portion is a concave curved surface (curvature radius=3.0, 4.5, 5.5, and 6.0). Specifically, using water as the liquid, a liquid film was formed at the minimum wetting flow rate, the critical Weber number was measured, and the inclination angle of the concave curved surface at a position where the side edge of the liquid film was in contact was examined, to graph these results. The receding contact angle $θ_R$ of water with respect to the side surface of the wall portion of the packing element (made of stainless steel (SUS304)) is about 24°. According to FIG. 5, it is understood that the critical Weber number approaches the theoretical value as the inclination angle θ decreases, and that the critical Weber number becomes minimum near the receding contact angle $θ_R$.

The relationship shown in FIG. 5 is consistent with the measurement result using the packing element of the same material as shown in FIG. 3 where the side surface of the wall portion has an inclined plane surface. To a packing element having an inclined plane surface provided on the side surface of the wall portion to have an inclination angle A of 20° with respect to the liquid film-forming surface, water was supplied to form a liquid film and the critical Weber number was measured to be 0.58. This value supports the tendency shown in the graph of FIG. 5. As described above, by setting the inclination angle θ of the side surface of the wall portion based on the receding contact angle $θ_R$ of the liquid, it is possible to reduce the critical Weber number as to suppress the meniscus formation in the liquid film and prevent the liquid film breakage.

As described above, the inclination angle θ of the inclined surface on the side surface of the wall portion with respect to the liquid film-forming surface may be, at the surface position of the liquid film, the above-described predetermined angle, i.e., in a range encompassing the receding contact angle. In other words, the inclination angles at positions higher and lower than the height of the liquid film are not particularly limited. Therefore, the shape of the side surface of the wall portion is not limited to the shape shown in FIG. 3 or FIG. 4, and various modification are possible. The convex curved surface shown in FIG. 4 has a shape of a partial cylindrical surface, but may have another convex curved surface shape. For example, a partial surface obtained by dividing an oval cylindrical surface or an elliptic cylindrical surface along the axial direction, that is, a partial oval cylindrical surface, a partial elliptic cylindrical surface, or the like can be given. When it is a vertically long elliptical cylindrical surface such as that the minor axis of the ellipse is parallel to the liquid film-forming surface, the expansion of the base of the wall portion can be reduced, which is advantageous in securing the area of the liquid film-forming surface. As a similar shape, a slope having a convex curved surface whose contour describes a conic curve such as a parabola or a hyperbola may also be used. Alternatively, the inclined surface may be formed in a shape combining a convex curved surface and an inclined plane surface. For example, when forming the inclined surface by the upper surface being in an inclined flat surface and the continuous lower surface being formed as a convex curved surface, the expansion of the base of the wall portion can be reduced, similarly to the case of the inclined surface of the vertically long elliptical cylinder shape. This is advantageous for securing the area of the liquid film-forming surface. Further, the inclined surface may be constituted by an inclined planar upper surface and a planar lower surface perpendicular to the liquid film-forming surface. In this manner, in the vicinity of the surface position of the liquid film, the inclination angle of the side surface of the wall portion may be a receding contact angle of the liquid or a value close thereto, and the shape of the side surface above or below the surface position can be appropriately modified as needed.

Regarding the packing element as shown in FIG. 4 in which the side surface of the wall portion is a convex curved surface (partial cylindrical surface), it is possible to determine the optimum value of the curvature radius Rs by using either of 1) experimental measurement, 2) flow analysis based on computation fluid dynamics (CFD), or 3) theoretical calculation. As one method, there is a determination by finding the surface shape of the liquid film formed on the liquid film-forming surface, and, as another method, a determination by finding the critical Weber number $We_c$ can be mentioned. In the method of finding the surface shape of the liquid film, it is possible to determine directly the curvature radius Rs when it comes to the optimum surface shape among the obtainable surface shapes. In the method of finding the critical Weber number $We_c$, the correlation between the critical Weber number $We_c$ and the curvature radius Rs is examined, and the value of the curvature radius Rs when the critical Weber number $We_c$ becomes the minimum can be regarded as the optimum value.

The critical Weber number $We_c$ is a Weber number We in a critical condition where the dry out appears/disappears in forming the liquid film. The Weber number We is a dimensionless number that can be expressed by the following formula (3), wherein ρ is the density of the liquid, U and δ are the average velocity of the liquid and the average thickness of the liquid film according to Nusselt's theoretical formula, and σ is the surface tension of the liquid. Therefore, the Weber number We is increased, for example, by increasing the flow rate of the liquid to be supplied to the liquid film-forming surface, that is, by increasing the liquid film speed or the liquid film thickness. It has been also found that the Weber number We has a correlation with an area ratio of the liquid film (a ratio of the area where the liquid film is formed relative to the entire liquid film-forming surface). Specifically, the area ratio of the liquid film increases as the Weber number We increases, and the area ratio of the liquid film reaches 1 (the liquid film is formed on the entire surface and the dry out disappears) at the critical Weber number $We_c$. In other words, the critical Weber number $We_c$ corresponds to the minimum value of the liquid film thickness that can be taken under the condition that the dry out disappears, and is expressed by the following formula (4). Therefore, the relationship between the critical Weber number $We_c$ obtained in the experiment of forming the liquid film on the liquid film-forming surface Sf of the packing element 20 and the curvature radius Rs in the inclined surface Sc of the packing element 20 is examined, and a curvature radius Rs at which the critical Weber Number $We_c$ becomes the minimum is regarded as the optimum value Rc.

$$We = (\rho \times U^2 \times \delta)/\sigma \qquad (3)$$
$$= (\rho \times \Gamma^2)/(\sigma \times \delta c)$$

$$We_c = (\rho \times Uc^2 \times \delta c)/\sigma \qquad (4)$$
$$= (\rho \times \Gamma^2)/(\sigma \times \delta c)$$

In the formula (4) showing the critical Weber number $We_c$ mentioned above, the thickness $\delta c$ of the liquid film according to Nusselt's theoretical formula is expressed as shown in the following formula (5) using the flow rate T (m²/s) per unit length in the width direction of the liquid film flow. In the formula, g is the gravitational acceleration, and β is the angle of the liquid film-forming surface with respect to the horizontal plane. Therefore, from the formulas (4) and (5), the thickness $\delta c$ of the liquid film can be obtained by the formula (6) with respect to the critical Weber number $We_c$.

$$\delta_c = \left(\frac{3\nu\Gamma}{g\sin\beta}\right)^{1/3} \qquad (5)$$

$$\delta_c = \left[\frac{9\nu^2\sigma We_c}{\rho g^2 \sin^2\beta}\right]^{0.2} \qquad (6)$$

On the other hand, the theoretical value of the critical Weber number $We_c$ in the flat plate material without the wall portion is given as the solution of the following formula (7). In the formula, $\theta_A$ is the advancing contact angle of the liquid with respect to the flat plate material, and, v is the kinetic viscosity, σ is the surface tension and ρ is the density of the liquid. In the formula (7), in the range of $\theta_A$ being 40 to 110°, v being 0.9 to 7.6 mm²/s, and σ being 34 to 72 mN/m, the value of the critical Weber number $We_c$ is a value in the range of 0.1 to 1.2. This value shows good agreement with experimental values, for various liquids and contact angle values. The influence of physical properties on $We_c$ is relatively small, and, if the viscosity coefficient is in the range up to about several times relative to the water, the value of the critical Weber number $We_c$ can be approximated as a function of $\theta_A$, resulting in $We_c \approx 0.833(1-\theta_A)$.

$$1.2We_c - (1-\cos\theta_A) + \qquad (7)$$
$$6.94\left(\frac{\rho^3 v^4 g \sin\beta}{\sigma^3}\right)^{1/5} We_c^{2/5} \times \left[\frac{\theta_A - \sin\theta_A \cos\theta_A}{(1-\cos\theta_A)^2}\right] = 0$$

When the liquid film thickness δ is obtained from the formula (6) using the critical Weber number $We_c$ of the above-described formula (7) and this is taken as the liquid film thickness δc under the critical condition, the forms of FIG. 3 and FIG. 4 hold, at this value, based on the aforementioned geometric relationship, and the formula (2) holds in FIG. 4. Therefore, the optimum value of the curvature radius Rs in FIG. 4 is Rc obtained from the formula (2) using the liquid film thickness δc. In this way, it is possible to determine the optimum value of the curvature radius Rs by theoretical calculation using the formulas (2) to (7). In this method, the optimum value of the curvature radius Rs is determined based on the critical Weber number $We_c$.

Meanwhile, the wettability of the metal plate may change sensitively depending on the degree of surface contamination, the elapsed time of use, the surrounding environment, and the like. In this regard, in the packing element, the configurations in which the side surface of the wall portion has an inclined surface of a flat shape or convex curved shape (FIG. 3 and FIG. 4) have the advantage that the liquid film surface has better stability than the form in which the side surface has a concave curved surface. That is, as shown below, the influence of the change in the receding contact angle due to the change in the state of the side surface of the wall portion on the optimum value Rc of the curvature radius is smaller in the case where the side surface has a flat or convexly curved inclined surface than in the case where the side surface has a concave curved surface.

Specifically, for the optimum value of the curvature radius Rc, as formulas for evaluating the sensitivity of the receding contact angle $\theta_R$, an expression obtained by differentiating each of the above formulas (1) and (2) with the receding contact angle $\theta_R$ is obtained. Then the following formula (8) is obtained from the formula (1) and the following formula (9) is obtained from the formula (2), respectively.

$$dRc/d\theta_R = (-\delta c \times \sin\theta_R)/(1-\cos\theta_R)^2 \qquad (8)$$

$$dRc/d\theta_R = (\delta c \times \sin\theta_R)/(\cos\theta_R - \cos\alpha)^2 \qquad (9)$$

In the case of a metal material such as a stainless steel plate, the receding contact angle $\theta_R$ is generally about 20°, and the denominator of the formula (8) becomes a considerably small value, so that the absolute value of the formula (8) becomes large. On the other hand, the denominator of the formula (9), which changes depending on the central angle α, is clearly larger than the denominator of the formula (8) when α≈90°, and the absolute value of the formula (9) is less than the absolute value of (8). For example, assuming that the receding contact angle $\theta_R$ changes from 20° to 30°, the optimum value Rc of the curvature radius in the formula (1) changes from 5.6 mm to 2.5 mm, and the sensitivity value shown by the formula (8) is about 3.5. At this time, the side edge of the liquid film moves from the side surface of the wall portion toward the liquid film-forming surface, and the liquid film is easily broken. In comparison, the optimum value of the curvature radius Rc (when α=90°) in the formula (2) changes from 0.4 mm to 0.43 mm, and the sensitivity of the formula (9) becomes about 0.14. As describe above, in the form of FIG. 4, since the change in the receding contact angle on the side surface, or, the change in the optimal condition due to the change in wettability is small, the influence of the change in the wettability of the side surface on the liquid film formation is smaller than that in the case where the side surface has a concave curved surface. Therefore, it is possible to form a stable liquid film with good responsiveness to changes in the situation. In this regard, it is possible to regard the configuration having the inclined plane surface in FIG. 3 as being intermediate between the configuration having the convex curved surface in FIG. 4 and the configuration having the concave curved surface. The above-mentioned advantage in the embodiment of FIG. 4 is also obtained in a case where the inclined surface is deformed into another convex curved surface such as a partial elliptic cylindrical surface, and the magnitude of the effectiveness depends on the configuration of the curved surface.

Figure 6:
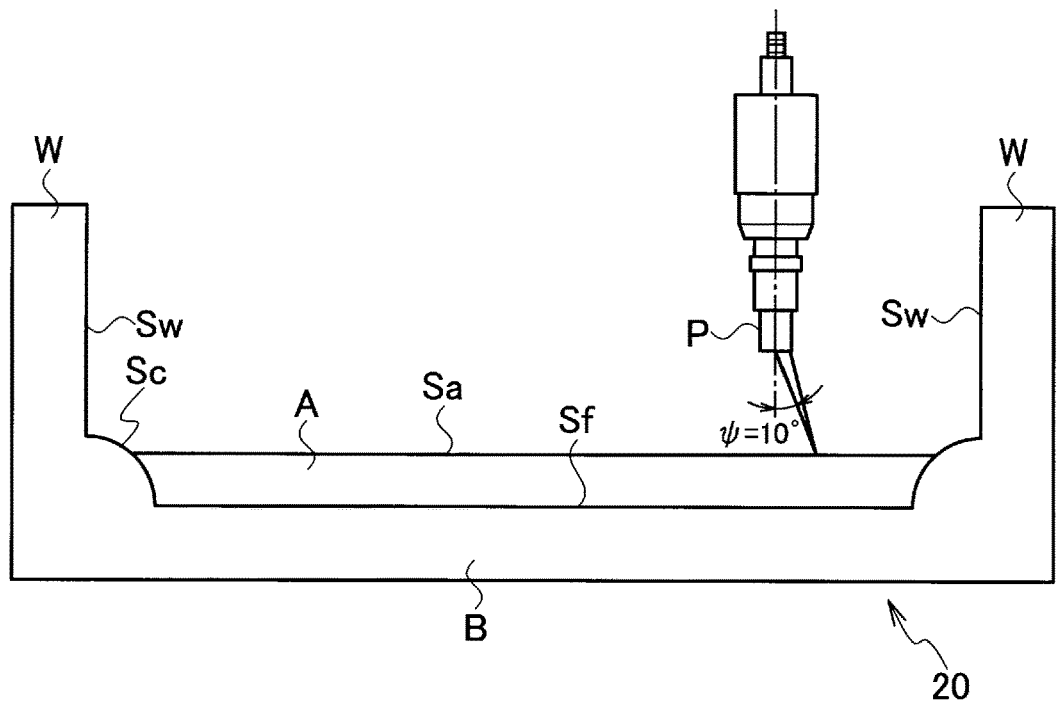
FIG. 6 is a cross-sectional view for explaining a liquid film formed on the packing element and its measurement.

In the experimental measurement, for example, as shown in FIG. 6, a liquid is supplied to the packing element to flow down on the liquid film-forming surface Sf, to form a liquid film. Then the position of the liquid film surface Sa (the liquid film height h) is measured according to the stylus method using a needle probe P. The relationship between the distance x from the side surface Sw of the wall portion W and the height h of the liquid film (based on the liquid film-forming surface of the main body B) is shown in a graph, whereby the surface shape of the liquid film can be obtained. According to the obtained graph, the shape of the liquid film changes by varying the curvature radius Rs on the inclined surface Sc of the packing element. Further, as can be seen from FIG. 4, the shape of the liquid film also changes depending on the setting of the central angle α. When water (20° C., Weber number We=0.8) is supplied as a liquid to a packing element (distance between wall portions: 50 mm, angle β of the liquid film-forming surface relative to the horizontal plane during use: 60°) made of stainless steel (SUS304), and when the central angle α is 90°, the optimum value at which the minimized region disappears is obtained at the curvature radius Rs being in the range of about 0.1 to 1 mm. As described above, the change in the surface shape of the liquid film is examined with varying the curvature of the inclined surface Sc provided at the boundary between the wall portion W and the main body portion B. Thereby, it is possible to determine an optimal curvature such as to prevent a minimized region from appearing in the surface shape of the liquid film. Therefore, a suitable shape of the packing element can be designed by performing such a measurement under desired gas-liquid contact conditions.

If extracting the minimum value of the liquid film height and the value at the central portion of the liquid film for each curvature radius Rs from measurement data of surface shape of the liquid film, and if calculating the difference between these heights, it makes the decision easier since the change in the difference between the heights of the liquid film is remarkable. That is, the optimum value of the curvature radius Rs can be easily determined based on the difference between the heights of the liquid film. The determination of the optimum value of the curvature radius Rs based on the difference in liquid film height can be said to be a method suitable for automation by data processing.

Since the liquid film formation changes depending on the surface tension, density, kinematic viscosity, and the state (material, roughness, etc.) of the liquid film-forming surface, the optimum value of the curvature radius Rs also changes if such conditions change. The liquid film formation also changes depending on the angle β of the liquid film-forming surface, and thus the optimum value changes if the use condition of the packing is different. Since the measurement data as described above can be obtained also by using the CFD analysis, the curvature radius Rs may be determined by using the CFD analysis instead of the experimental measurement, so that it is possible to cope with a change in the condition setting. The shape of the formed liquid film changes depending on the physical properties of the liquid, but in any case, the relationship between the critical Weber number $We_c$ and the curvature radius Rs shows the same changing tendency. Therefore, even if variously changing the liquid used, it is possible to suppress the appearance of the minimized region in the liquid film formation by optimizing the curvature radius Rs.

The relationship between the height (thickness) h of the liquid film and the distance x from the wall portion has been determined by each of the experimental measurement and the CFD analysis, for the case where a liquid film is formed on a packing element in which the side surface of the wall portion is perpendicular to the liquid film-forming surface. Then it has been found that the results of the experimental measurement and the CFD analysis are close to the result obtained by theoretical calculation. In addition, it has been found that, also in the case of a wall portion having a concavely curved inclined surface, the results of the experimental measurement and the CFD analysis are consistent with the theoretically calculated value. Therefore, also for the packing element formed such that the side surface of the wall portion has a convexly curved inclined surface Sc, the optimum value of the curvature radius Rs is possibly determined from the relationship between the curvature radius Rs of the inclined surface Sc and the surface shape of the liquid film.

As described above, the wall portion W having a side surface having the inclined surface Sp or the inclined surface Sc has a shape effective for suppressing liquid film breakage. Therefore, it is possible to provide the wall portion W over the entire side end of the liquid film-forming surface along the liquid flow direction, like the rib Z in FIG. 2. However, it is not limited to this manner, and the wall portion may be divided into a plurality of short wall portions along the flow direction if the side surface has the inclined surface Sp or the inclined surface Sc. The plurality of short wall portions W may be arranged at intervals. Further, the wall portion W does not need to be formed integrally with the main body portion B, and the wall portion W formed separately may be bonded to the main body portion B by using an appropriate joining method. Therefore, the packing element may be formed by using a plurality of short rib pieces whose roots are expanded so that the side surface has the inclined surface Sp or the inclined surface Sc. In this case, the rib pieces may be adhered to the liquid film-forming surface at appropriate intervals so that the rib pieces are substantially evenly distributed on the liquid film-forming surface of the flat plate-shaped main body B.

The wall portion W has a role as a reinforcing material that improves the strength of the main body portion B and suppress bending and deformation. Furthermore, when the wall portion is configured to have a height that exceeds the surface of the liquid film formed by the liquid, it also serves as a spacer for maintaining the interval between the packing elements. In this case, the height of the wall portion may be set so that the flow resistance of the gas in the space (flow path) formed between the packing elements is reduced. That is, the height of the wall portion W is set to a height necessary to secure an interval at which gas easily flows, with reference to the liquid film-forming surface. The side surface of such a wall portion includes an extended surface Se (see, for example, FIG. 7) that extends while being connected to the above-described inclined surface.

As described above, the configuration of the packing elements 10 and 20 shown in FIG. 3 and FIG. 4 is a basic configuration, and various applications and modifications are possible. Hereinafter, specific examples thereof will be described, but the packing element in the present disclosure is not limited thereto, and can be variously changed in consideration of the implementation environment of the gas-liquid contact, the production condition of the packing, and the like.

Figure 7A:
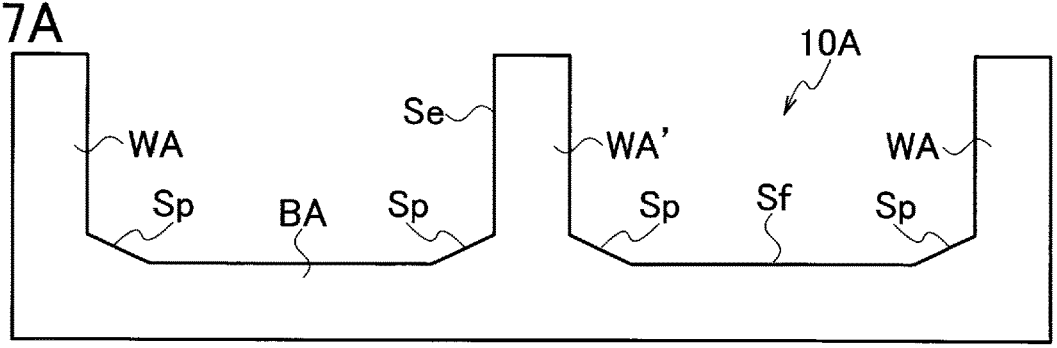
FIG. 7A to FIG. 7E are perspective views illustrating embodiments of the packing element having a planar inclined surface.
Figure 7B:
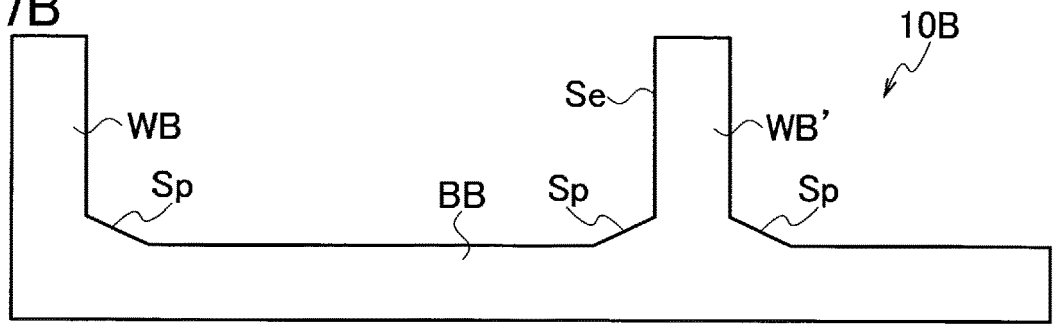
Figure 7C:
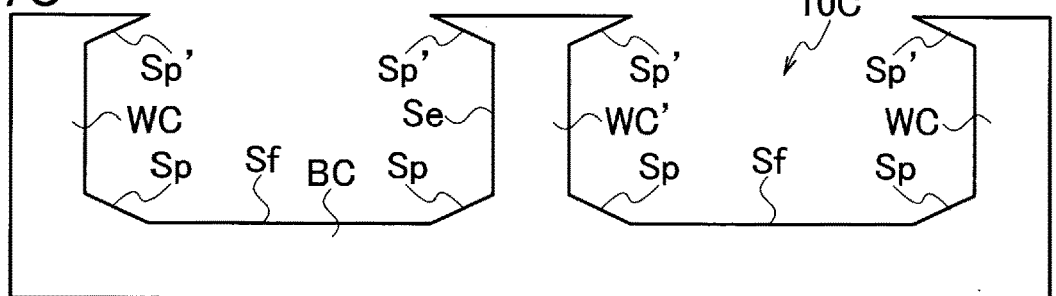
Figure 7D:
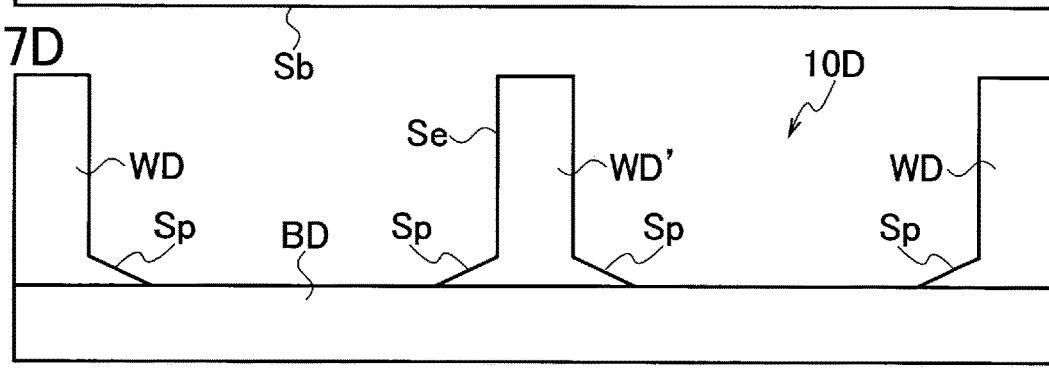
Figure 7E:
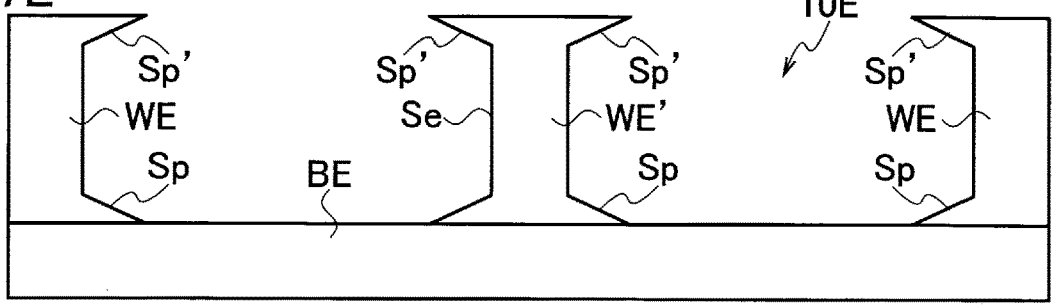

The packing elements 10A, 10B and 100 of FIG. 7A to FIG. 7C are embodiments configured so that the wall portions and the main body portion are integral with each other, and the inclined surface Sp is planar. The packing elements 10D and 10E of FIG. 7D and FIG. 7E are embodiments configured to have the same shape as the packing element 10A or 10C by joining the wall portions and the main body portion prepared as separate bodies. The packing elements 10A, 10B and 100 can be manufactured by cutting processing for forming grooves in a plate-like material, molding of a molten raw material, or the like. Since the packing elements 10D and 10E are obtained by fabricating each part from the raw material and bonding the wall portions and the main body portion by a bonding method applicable to the material, there are wide varieties of methods applicable to the forming and processing of each part.

The packing element 10A of FIG. 7A has wall portions WA at the both side ends of the main body portion BA and a wall portion WA' at the center, and the reinforcing effect by the wall portions is larger than that in the configuration with the wall portions only on both side ends. That is, it is possible to change the number and positions of the wall portions appropriately according to the degree of necessity of reinforcement. It is not necessary to provide the wall portion at both side ends of the main body portion, and a structure such that the wall portion is not provided on one side or both sides is allowed as well. For example, in the packing element 10B of FIG. 7B, one side end of the main body portion BB has no wall portion, and additionally, the wall portion WB' is provided at a position deviated from the center. Although this packing element 10B is biased in terms of strength balance, it is available if the balance as the whole packing assembled from the packing elements is good, or if the positions of the wall portions are aligned as a whole in a raw. The side surfaces of the wall portions WA and WA' have an inclined surface Sp connected to the liquid film-forming surface Sf and an extended surface Se connected to the inclined surface Sp, respectively, and the wall portions WA and WA' has a height to function as spacers for maintaining the spacing between the packing elements.

When installing and using the packing elements so that the liquid film-forming surface is vertical, it is possible to form the liquid film not only on the liquid film-forming surface between the wall portions but also on the back surface opposite to the wall portions. Therefore, in such a usage form, it is preferable that the liquid film breakage is possibly suppressed on both surfaces. The packing element 100 of FIG. 7C has a configuration in which liquid film breakage on the back surface Sb of the main body portion BC can be suppressed in the packing assembled by arranging a plurality of the packing elements in parallel. In the packing element 10C, the tips of the wall portions WC, WC' are spread in the same manner as their base and they are formed with an inclined surface Sp'. Therefore, when the packing elements 100 are arranged side by side in a stacked state, the tip ends of the wall portions WC, WC' are brought into close contact with the back surface of the adjacent packing element, so that the inclined surfaces Sp' of the tips continue to the back surface of the adjacent packing element. The inclination angle of the inclined surface Sp', that is, the exterior angle with respect to the back surface Sb of the adjacent packing element is the same as the base inclined surface Sp, and the back surface is in the same state of the liquid film-forming surface Sf. When the raw material has ductility such as metals, the packing element 10C can be obtained by deforming the tips of the wall portions WA, WA' of the packing element 10A having the shape of FIG. 7A, with use of plastic working by pressure such as forging, so as to shape like the tip portions of wall portions WC, WC'. When the raw material is softened by heating or the like, the tip of the wall portion can be softened and shaped similarly. In the embodiment as shown in FIG. 7C, it is also possible to make a change such that the height of the wall portions WC, WC' is lowered so that the side surfaces of the wall portions WC, WC' are constituted only by the inclined surfaces Sp, Sp'.

In the packing elements 10D and 10E of FIG. 7D and FIG. 7E, the main body portions BD and BD have a flat plate shape. Therefore, it is possible to fabricate them by processing ribs corresponding to the wall portions WD, WD', WE, WE' and joining them to the flat plate. These embodiments are advantageous in that 1) the wall portion and the main body portion can be made of different materials, and 2) it is easy to redo the forming process and reduction of the manufacturing loss is easy. Examples of the bonding method include utilization of a known adhesive, thermocompression bonding, welding, fusion bonding, and the like. Moreover, it is possible to modify the form of the packing elements 10D, 10E so that positioning and joining can be performed at the same time. For example, in a flat plate to constitute the main body portion BD or BE, grooves or holes for fitting are provided at the positions where the wall portions are to be joined. And the wall portions WD, WD', WE, WE' are formed so that projections which can be fitted into the grooves or holes protrude from the bottom surfaces (bonding surfaces) of the wall portions. Then, by fitting the projections into the grooves or holes, the joining of the two is completed.

Figure 8:
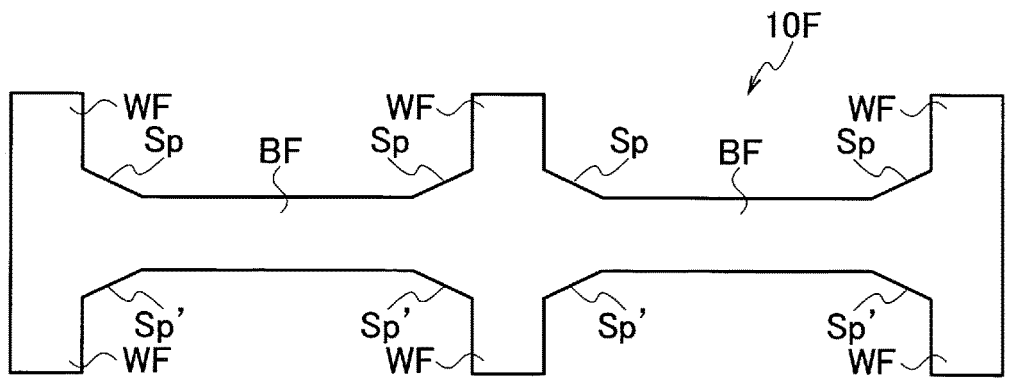
FIG. 8 is a perspective view illustrating another embodiment of the packing element having the planar inclined surface.

The packing element 10F shown in FIG. 8 is an embodiment having liquid film-forming surfaces on both the front and back surfaces. Since the wall portions WF are provided to stand on both sides of the main body portion BF and the inclined surfaces Sp and Sp' are formed at the base of the wall portions WF, suitable liquid film-forming surfaces are formed on both surfaces of the main body portion BF. Therefore, for use in a vertical standing position, this embodiment may be in a single state or a stacked state of plural members.

FIG. 9A to FIG. 9E show embodiments of the packing element that can be fabricated by bending processing of a material of thin layer plate shape that can be plastically worked. Therefore, in these embodiments, the main body portion BG to BK is integral with the wall portion WG to WK.

Figure 9A:
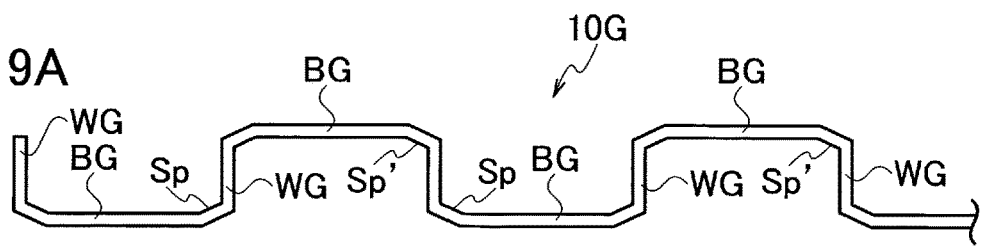
FIG. 9A to FIG. 9E are perspective views illustrating further embodiments of the packing element having the planar inclined surface.

The packing element 10G of FIG. 9A is an embodiment in which the bending processing is performed into a corrugate form. On one surface, a liquid film-forming surface having inclined surfaces Sp at both side ends is formed, and on the other surface, a liquid film-forming surface having inclined surfaces Sp' is formed. Therefore, in this embodiment, suitable liquid film is formed on both surfaces in use in a vertical standing position, as with the packing element 10F. On the backside of the liquid film-forming surface sandwiched between the wall portions WG, the minimized region does not occur in the liquid film shape and the liquid film is formed satisfactorily on the backside as well.

Figure 9B:
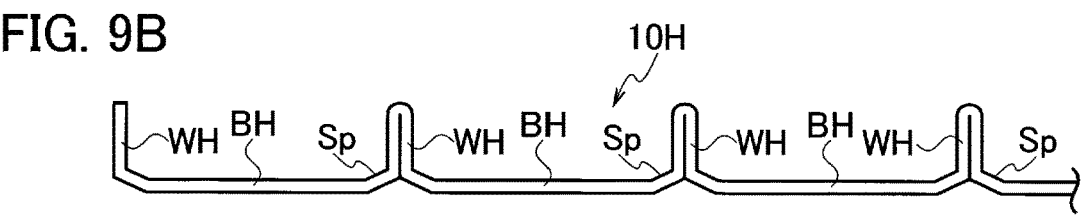

The packing element 10H of FIG. 9B is an embodiment formed into a shape corresponding to the packing elements 10A, 10D of FIG. 7A and FIG. 7D. The tip end of the wall portion WH is formed by folding a part of the thin layer plate material and bring into close contact, and the base of the wall portion WH is bent to form the inclined surface Sp. As a result, the liquid film-forming surface in which both side ends connect to the inclined surfaces Sc is formed on the surface of one side. Therefore, the packing element 10H has the same function as the packing elements 10A, 10D of FIG. 7A and FIG. 7D, and good liquid film is formed on the liquid film-forming surface between the wall portions WH in use as in an installed state where it is inclined from the vertical direction (angle β<90°).

Figure 9C:
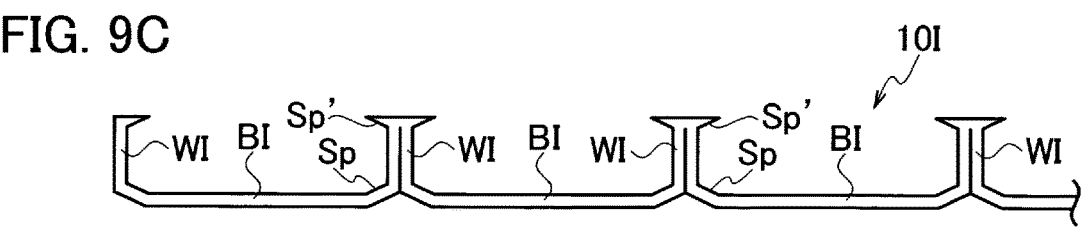

The packing element 10I of FIG. 9C is an embodiment formed into a shape corresponding to the packing elements 10O, 10E of FIG. 7C and FIG. 7E. The wall portion WI is obtained by forming the wall portion WH of FIG. 9B and then subjecting it to forming processing so that the tip of the wall portion expands similarly to the base thereof, and plastic working as described for the embodiment of FIG. 7C is available.

Figure 9D:
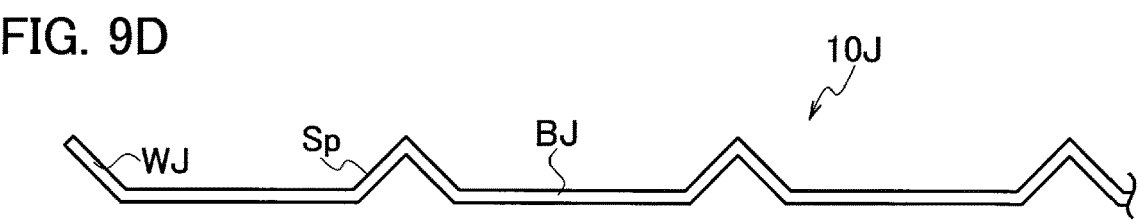
Figure 9E:
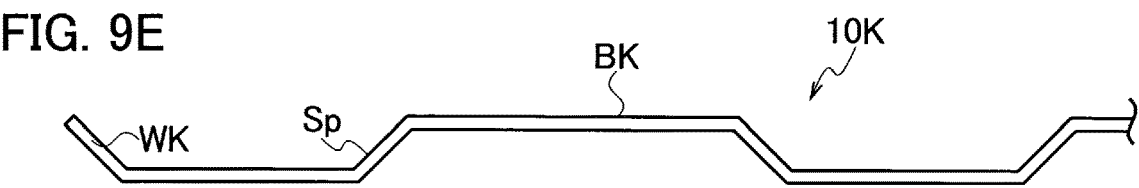

The shape of the packing element 10H may be changed to one shown in FIG. 9D. Similarly, the packing element 10G may be deformed as shown in FIG. 9E. The wall portions WJ, WK of the packing elements 10J, 10K are formed by bending a thin layer plate material in a V shape, and the entire side surfaces of the wall portions WJ, WK form an inclined surface Sp that is inclined with respect to the main body portion BJ. These embodiments are forms that are easy to process and are useful when a spacer, a fixture, or the like is used separately.

FIG. 10 shows embodiments in which the side surface of the wall portion has a convexly curved inclined surface Sc. That is, these correspond to examples in which the inclined side surface in the embodiments of FIG. 7 is transformed into a convex curved surface. In the packing elements 20A, 20B and 20C shown in FIG. 10A to FIG. 10O, the wall portion and the main body portion are integrally formed. The packing elements 20D and 20E of FIG. 10D and FIG. 10E are embodiments configured to have the same shape as the packing elements 20A and 20C by joining the wall portions and the main body portion prepared separately, in the same manner as the packing elements 10D and 10E of FIG. 7.

Figure 10A:
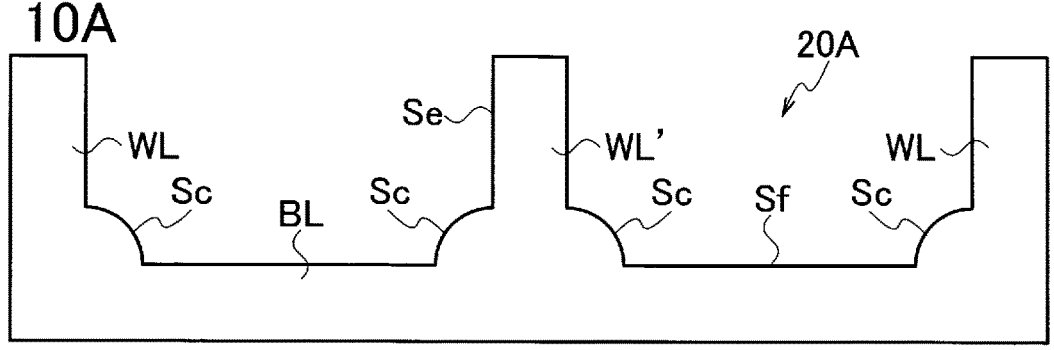
FIG. 10A to FIG. 10E are perspective views illustrating embodiments of the packing element having a convexly curved inclined surface.
Figure 10B:
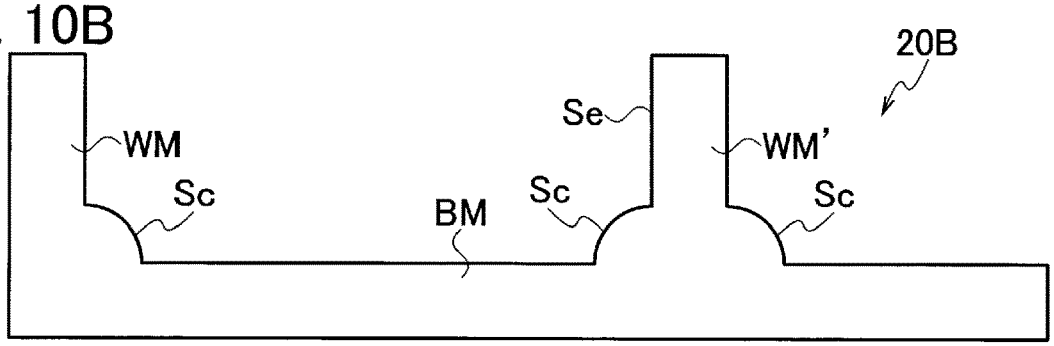

The packing element 20A in FIG. 10A has wall portions WL on both side ends of the main body portion BL and a wall portion WL' at the center thereof. It is possible to change appropriately the number and position of the wall portions according to the degree of necessity of reinforcement. It is not necessary to provide wall portions on both ends of the main body portion, and a configuration in which no wall portions are provided on one or both sides is also possible. For example, in the packing element 20B of FIG. 10B, a wall portion WM is provided at one side end of the main body BM, but is not provided at the other end, and the wall portion WM' is provided at a position deviated from the center.

Figure 10C:
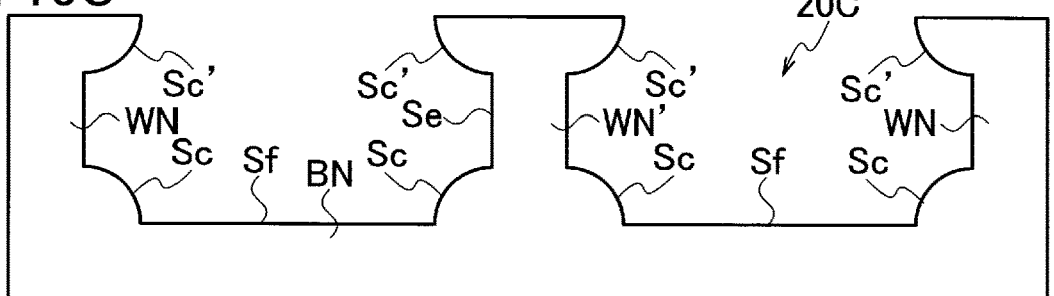

The packing element 20C of FIG. 10C has a configuration in which a liquid film breakage on the back surface Sb of the main body portion BN can be suppressed in a packing assembled by arranging a plurality of the packing elements in parallel. In the packing element 20C, the tips of the wall portions WC, WC' are spread in the same manner as their base and they are formed with an inclined surface Sc' having the same curvature radius as the inclined surface Sc of the base. Therefore, when the packing elements 20C are arranged side by side in a stacked state, the tip ends of the wall portions WC, WC' are brought into close contact with the back surface of the adjacent packing element, so that the inclined surfaces Sc' of the tips connect to the back surface of the adjacent packing element. The back surface is in the same state as the liquid film-forming surface Sf. Therefore, when installing and using the packing elements so that the liquid film-forming surface is vertical, it is possible to form the liquid film not only on the liquid film-forming surface between the wall portions but also on the back surface opposite to the wall portions. Therefore, it is possible to suppress the liquid film breakage on both surfaces. When the raw material has ductility or thermos-plasticity such as metals, the packing element 20C can be obtained by deforming the tips of the wall portions WN, WN' of the packing element 20A having the shape of FIG. 10A, with use of plastic working by pressure such as forging or softening, so as to shape like the tip portions of wall portions WN, WN'. In the embodiment as shown in FIG. 10O, it is also possible to make a change such that the height of the wall portions WN, WN' is lowered so that the side surfaces of the wall portions WN, WN' are constituted only by the inclined surfaces Sc, Sc'.

Figure 10D:
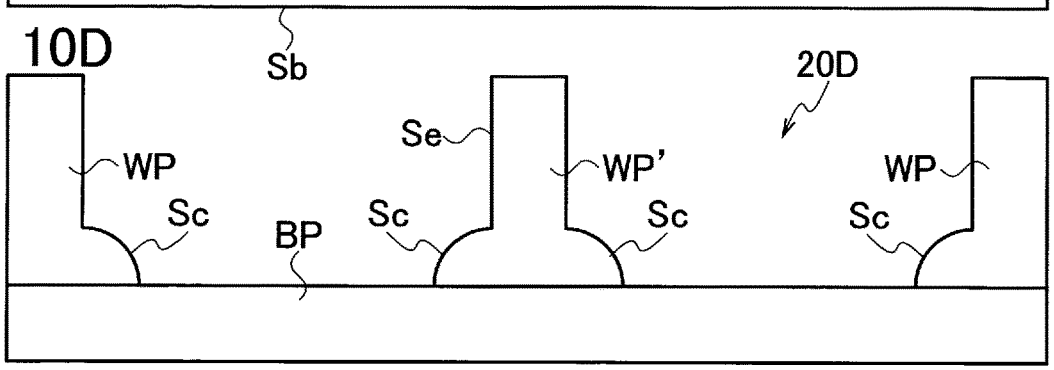
Figure 10E:
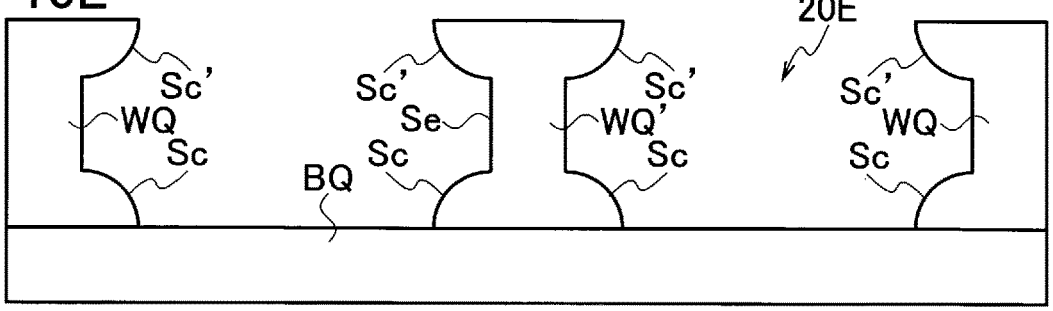

In the packing elements 20D and 20E of FIG. 10D and FIG. 10E, the main body portions BP and BQ are flat plates, and it is possible to fabricate them by processing ribs corresponding to the wall portions WP, WP', WQ, WQ' and joining them to the flat plate, as in the embodiments of FIG. 7D and FIG. 7E. Therefore, these embodiments have similar advantages as the packing elements 10D and 10E. Moreover, it is possible to modify the form of the packing elements 20D, 20E so that positioning and joining can be performed at the same time. That is, grooves or holes for fitting may be formed on the main body portion BP, BQ at the positions where the wall portions are to be joined. Then the wall portions WP, WP', WQ, WQ' are formed such that projections which can be fitted into the grooves or holes protrude from the bottom surfaces (bonding surfaces) of the wall portions.

Figure 11:
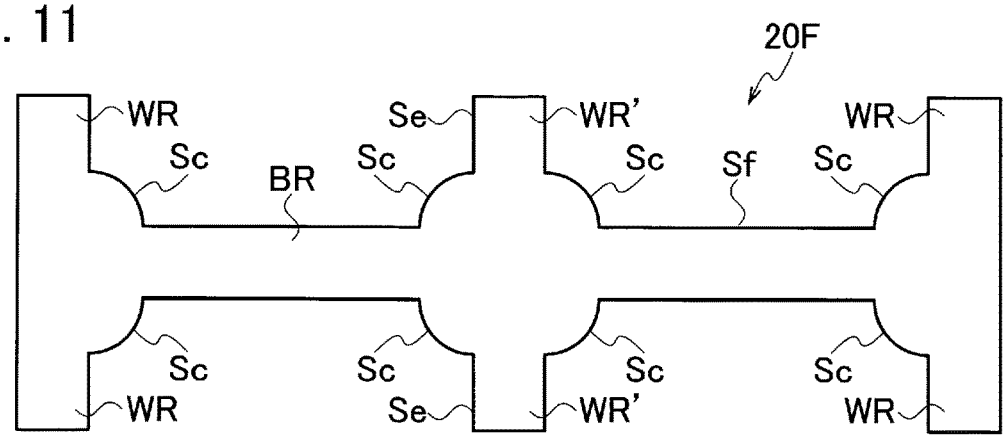
FIG. 11 is a perspective view illustrating another embodiment of the packing element having the convexly curved inclined surface.

The packing element 20F shown in FIG. 11 is an embodiment having liquid film-forming surfaces on both surfaces of the main body portion BR as in the packing element 10F. The wall portions WR and WR' are provided to stand on both sides of the main body portion BR and the inclined surfaces Sc and Sc' are formed at the base of the wall portions WR and WR'.

In the embodiments of FIG. 10 and FIG. 11, the side surfaces of the wall portions have an extended surface Se connected to the inclined surface Sp. When the spacing between the packing elements is small, or when the wall portion does not need to function as a spacer, it is possible, as shown in FIG. 12, to configure an embodiment in which there is no extended surface Se on the side surface of the wall portion. In the packing element 20G of FIG. 12A, semi-cylindrical wall portions WS and WS' are provided on the thin-layered main body portion BS and arranged in parallel at a predetermined interval, and the wall portion WT of the packing element 20H in FIG. 12B is deformed to have a shape obtained by dividing an oval cylinder in half. Therefore, the inclined surfaces Sc in each the packing element 20G and the packing element 20H are curved into a shape of quadri-sectioned cylindrical surface. FIG. 12C and FIG. 12D respectively show an example in which the packing element 20G is modified to have wall portions on both surface of the main body portion. In the packing element 20I of FIG. 12C, the main body portion BU and the wall portions WU, WU' are formed integrally. On the other hand, in the packing element 20J of FIG. 12D, the main body portion BV and the wall portions WV, WV' are separate bodies, and these are integrated by fitting to fix, or joining, etc. As for fixing the wall portions WV, WV' to the main body portion BV, for example, a groove for fitting can be provided at a position where the main body portion BV is joined on the side surface of the cylindrical wall portion WJ. Then the main body portion BV may be fitted into the groove, so that both members can be easily fixed.

Figure 12A:
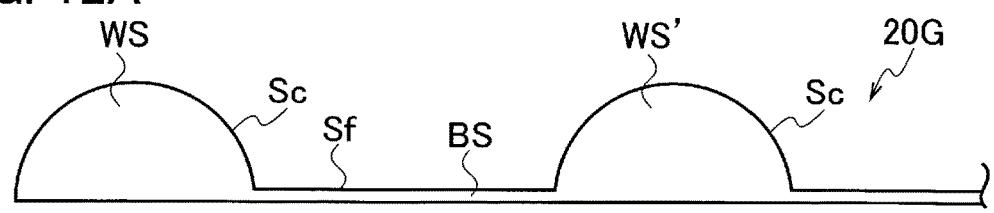
FIG. 12A to FIG. 12D are perspective views illustrating further embodiments of the packing element having the convexly curved inclined surface.
Figure 12B:
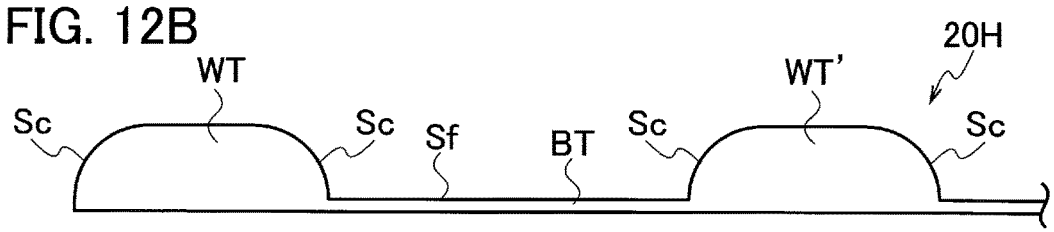
Figure 12C:
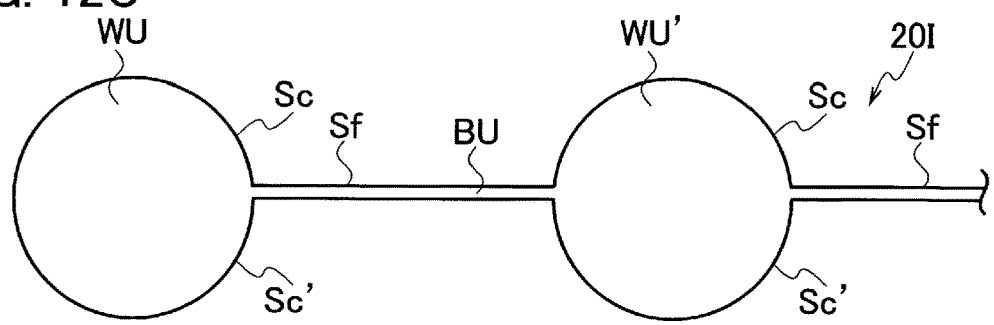
Figure 12D:
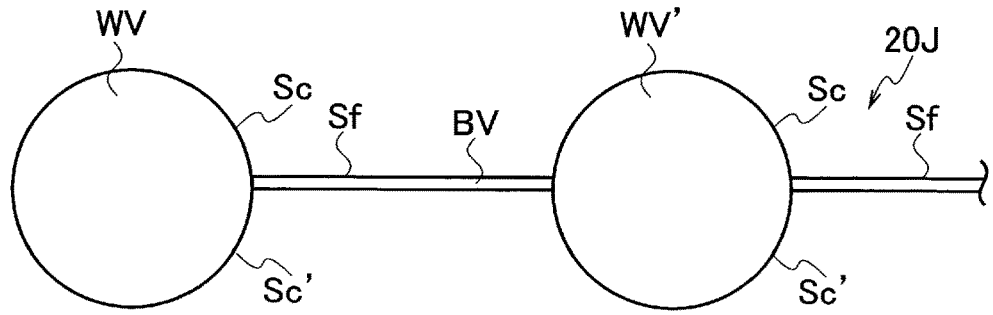
Figure 13A:
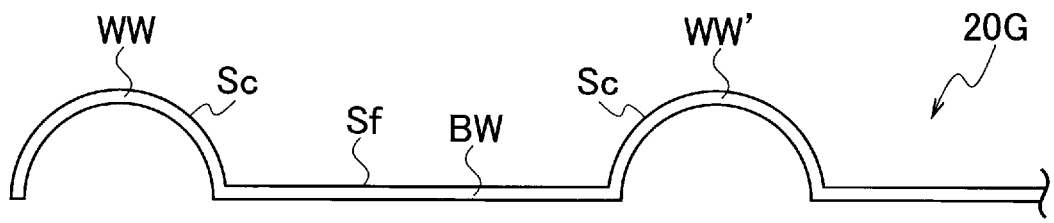
FIG. 13A to FIG. 13D are perspective views illustrating further embodiments of the packing element having the convexly curved inclined surface.
Figure 13B:
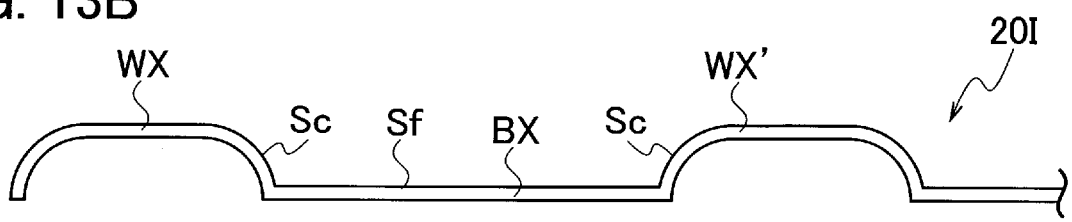

FIG. 13 shows embodiments of the packing element that are possibly fabricated by bending processing of a material of thin layer plate shape that can be plastically worked, and those of FIG. 13A and FIG. 13B have the same inclined surface Sc as the packing elements 20G, 20H of FIG. 12A and FIG. 12B. The packing element 20G of FIG. 13A has a shape in which main body portions BW of a flat plate shape and wall portions WW, WW' curved in a shape of semi-cylindrical surface are alternately connected. The packing element 20I of FIG. 13B has a shape in which main body portions BX of a flat plate shape and wall portions WX, WX' curved in a shape obtained by dividing an oval cylindrical surface in half are alternately connected.

Figure 13C:
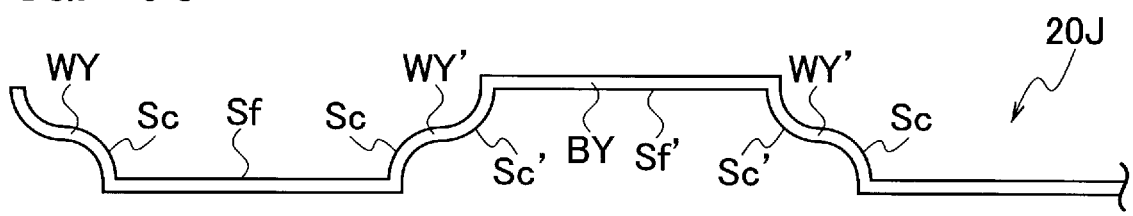

FIG. 13C shows an embodiment in which a bending processing is performed into a shape like a corrugate similar to the packing element 10G of FIG. 9A. The wall portions WX, WX' of the packing element 20J are curved in an S shape along two adjacent cylindrical surfaces. On one surface of the packing element 20J, a liquid film-forming surface Sf having inclined surfaces Sc on both side ends is formed, and on the other surface, a liquid film-forming surface Sf' having inclined surfaces Sc' on both side ends is formed. Therefore, in this embodiment, suitable liquid film is formed on both surfaces when used in a vertical standing position, as in the case of the packing element 20F. On the backside of the liquid film-forming surface sandwiched between the wall portions WY, the liquid film shape does not have a minimized region, and liquid film is formed well on the backside.

Figure 13D:
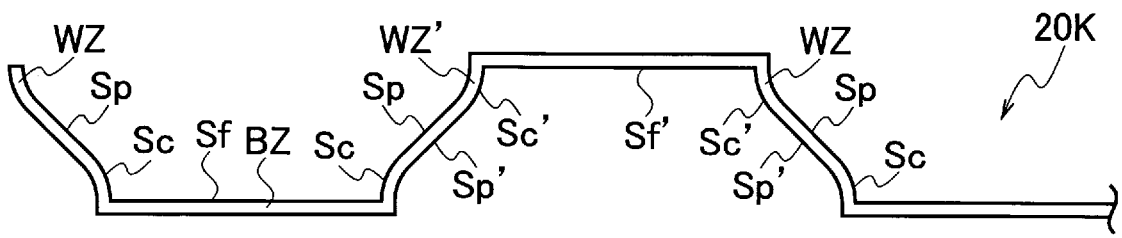

FIG. 13D also shows an embodiment in which a bending processing is performed into a shape like a corrugate similar to the packing element 20J of FIG. 13C. However, the wall portions WZ, WZ' of the packing element 20K are curved in an S shape along two separated cylindrical surfaces. That is, each of the wall portions WZ, WZ' is formed such that one planar portion smoothly connects the two curved portions. Therefore, on one surface of the packing element 20J, a liquid film-forming surface Sf is formed to have an inclined surface Sc and an inclined surface Sp continuous therewith on each of both side ends. On the other surface, a liquid film-forming surface Sf' is formed to have an inclined surface Sc' and a continuous inclined surface Sp' on each of both side ends.

Figure 14A:
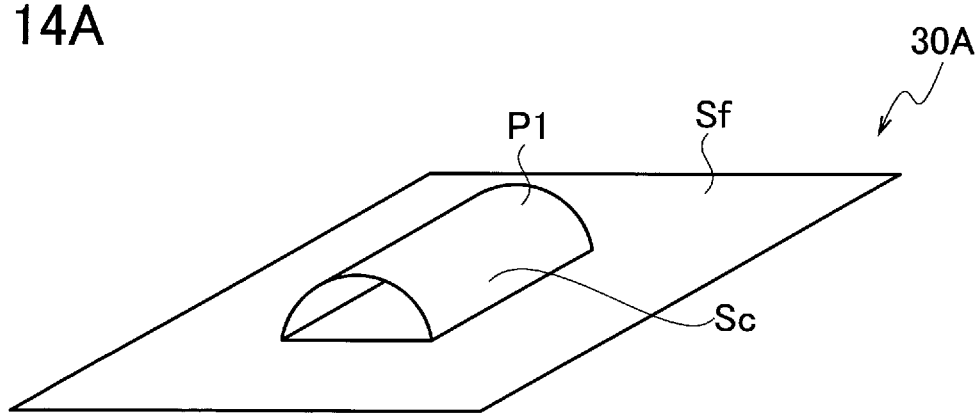
FIG. 14A and FIG. 14B are perspective views illustrating application examples of the packing element having the convexly curved inclined surface.
Figure 14B:
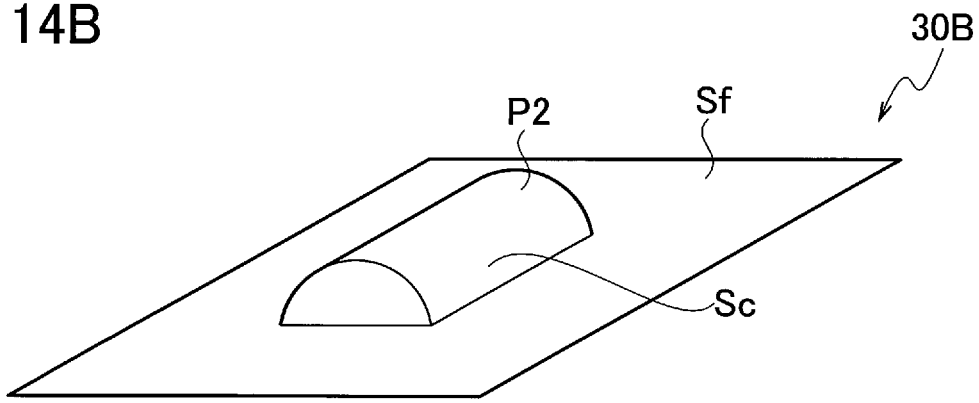

The shapes shown in FIG. 7 to FIG. 13 may be applied to the shape of the short rib piece described above. It is possible to prevent the stability of the liquid film formed on the liquid film-forming surface from being impaired when the rib piece is attached on the liquid film-forming surface. Moreover, when a metal thin plate material is used as a packing element, a protrusion P1 or P2 as shown in FIG. 14A or FIG. 14B may be appropriately formed, instead of attaching the rib piece, to obtain a packing element 30A or 30B having the function of the spacer. Even in such a case, it is possible to apply the technology of the present disclosure. Specifically, the packing elements 30A, 30A are formed such that the protrusions P1, P2 have a semi-cylindrical shape, and the side surfaces of the protrusion P1, P2 have the above-described inclined surface Sc. That is, the cross-sectional shapes of the packing elements 30A, 30A perpendicular to the liquid flow direction are as shown in FIG. 13A. Therefore, liquid film breakage is suppressed in the liquid film that is formed on both sides of the protrusion P1, P2 by the liquid flowing along the axial direction of the protrusion P1, P2. The liquid flowing on both sides of the protrusion P1, P2 gradually spreads and joins while wetting below the lower end of the protrusion. Such a protrusion can be formed by using a processing technique such as cut-and-draw processing, cut-and-raise processing, indentation processing, and the like. The embodiment of FIG. 14 may be modified so that the side surface has a flat inclined surface Sp.

A method for manufacturing a packing includes a designing step of designing a packing element, and a fabricating step of fabricating the packing element, using a raw material. In the designing step, a packing element having a main body and at least one wall portion is designed in such a manner that a side surface of the wall portion has an inclined surface which is inclined at a predetermined angle relative to a liquid film-forming surface in a surface position of a liquid film formed by a liquid on the liquid film-forming surface. At that time, the side surface of the wall portion is designed to have a convex curved surface or an inclined plane surface as the inclined surface, and an optimum value of the inclination angle θ or the curvature radius Rs can be obtained by a determination step of the following determining procedure. By setting, as the predetermined angle, the optimal value of the inclination angle or a range encompassing values close thereto, it is possible to design an inclined surface having a suitable inclination angle. Further, for the convex curved surface, the optimum value Rc of the curvature radius can be determined by calculation using the liquid film thickness δc where the liquid film thickness δc under the critical condition is obtained using the critical Weber number $We_c$. In this way, it is possible to design the inclined surface Sc having a curvature radius that reduces the critical Weber number.

<Determination Procedure>

To determine the optimum value of the inclination angle θ or the curvature radius Rs of the inclined surface by experimental measurement, candidate packing elements having the inclined surface with different inclination angle θ or curvature radius Rs are prepared by using the material of the packing element. Then the measurement of the surface shape of the liquid film or the critical Weber number $We_c$ as described above is performed repeatedly with use of each packing element.

In the measurement of the surface shape, data (the distance x and the liquid film height h) on the surface shape at each inclination angle θ or curvature radius Rs are obtained, as shown in FIG. 15 (details will be described later). From the obtained surface shape, the inclination angle θ or curvature radius Rs is determined which gives the surface shape in which the appearance of the minimized region is most suppressed (or disappears). Alternatively, the minimum value of the liquid film height and the value of the liquid film center portion at each inclination angle θ or curvature radius Rs are extracted from the surface shape data. Then the inclination angle or curvature radius Rs at which the difference between the minimum value of the liquid film height and the value of the liquid film center portion is minimized is determined. That is, the difference between the minimum value of the liquid film height and the value of the liquid film center portion is calculated for each inclination angle θ or curvature radius Rs, and these values are compared to determine the optimum value of the inclination angle θ or curvature radius Rs.

In the measurement of the critical Weber number $We_c$, the relationship between the critical Weber number $We_c$ and the inclination angle θ or curvature radius Rs as shown in FIG. 5 is obtained. Therefore, based on the obtained relationship, the inclination angle θ or curvature radius Rs at which the critical Weber number $We_c$ becomes the minimum value is determined as the optimum value.

In the above work, by performing CFD analysis instead of the experimental measurement, the optimum value of the inclination angle θ or curvature radius Rs can similarly be determined. Since the CFD analysis is a known analysis method, it is advisable to perform it according to the usual method. Solving a mass conservation equation (equation of continuity) and a momentum conservation equation (Navier-Stokes equation) in a one-fluid model gives numerical analysis results of three-dimensional unsteady flow. In the analysis, general-purpose thermal fluid analysis software can be used and, for example, FLUENT (registered trademark, ANSYS, Inc.), etc., can be mentioned. The behavior of the gas-liquid interface can be predicted by using the interface tracking method, and an example thereof is a VOF (Volume of Fluid) model. While determining the kinds of gas, liquid and solid (liquid film-forming surface) and setting the angle β of the liquid film-forming surface and the ambient temperature, the liquid film thickness at the boundary of the liquid entrance is defined. Then the analysis is allowed under the condition of inflow at uniform flow velocity.

The optimal value of the inclination angle θ of the inclined plane surface as the theoretical value is the receding contact angle $θ_R$ of the liquid with respect to the side surface of the wall portion. Thus an example of a method for determining the optimum value of the curvature radius Rs of the convex curved surface by the theoretical calculation will be described below. In this method, the optimum value of the curvature radius Rs is determined based on the relationship between the critical Weber number $We_c$ and the curvature radius Rs.

As setting of conditions, first, the material of the packing element to use, the composition of the liquid, and the execution condition (temperature) are set. On the bases of these, properties (density, viscosity, surface tension) of liquid and characteristics relating to solid-liquid contact (advancing contact angle, receding contact angle) are set. Further, the installation condition of the packing element (angle β of the liquid film-forming surface with respect to the horizontal plane) is determined.

Next, the critical Weber number $We_c$ is calculated from the advancing contact angle $θ_A$ of the liquid according to the approximate calculation based on the above-described formula (7). Using the obtained critical Weber number $We_c$, the dynamic viscosity v of the liquid, the surface tension σ, the density ρ, and the angle β of the liquid film-forming surface with respect to the horizontal plane, the liquid film thickness δc under the critical condition is calculated, based on the above formula (6). Using this calculated value, the optimum value of the curvature radius Rc is obtained from the above formula (2). This value is the optimum value of the curvature radius Rs.

The optimum value of the curvature radius Rs obtained is an approximate value. However, if the above experimental measured or CFD analysis is performed based on this value, it is possible to confirm or adjust the optimum value. In other words, the experimental measurement and the CFD analysis may be used to confirm or adjust the optimum value of the curvature radius Rs determined by the theoretical calculation. By narrowing down the candidate range of the curvature radius Rs by theoretical calculation, a prototype of the packing element can be prepared based on this result to perform experimental measurement or CFD analysis, whereby the packing element can be designed with high accuracy and efficiency. Therefore, it is useful also in a case of adapting to change of execution condition or device improvement in the gas-liquid contact apparatus 2. In general, the curvature radius Rs can be set within a range of about 0.3 to 50 mm. In many cases, the receding contact angle $θ_R$ of the liquid with respect to a metal surface is about 20 to 30', and the curvature radius Rs, in those cases, can be determined to a value of about 0.3 to 10 mm by the above-described method. The inclination angle θ and the curvature radius Rs of the inclined surface can be set within a range of a certain width including the optimum value.

Preparing a plurality of the packing elements designed as described above, they are assembled to arrange in parallel so that the positions of the wall portions are aligned in rows, thereby the packing 1 can be constructed. Considering that the wall portion W can function as a spacer when constructing the packing 1, it is appropriate to set the height of the wall portion W according to the requirement as the spacer in designing of the packing element. From the viewpoint of strength, it is suitable to provide the wall portion W substantially perpendicular to the liquid film-forming surface. It is convenient to set in such a manner that the flow path is formed at intervals at which the liquid film formation and the gas flow can be satisfactorily performed when the liquid A and the gas G are supplied to the packing 1. The height of the wall portion W (the level difference between the top portion of the wall portion W and the liquid film-forming surface) may be suitably set so that the flow resistance of the gas becomes low. Under ordinary gas-liquid contact conditions, the height of about 1 mm or more is suitable and, if setting to about 1 to 10 mm, it is also well in gas-liquid contact efficiency per volume, etc. The height may be smaller than the curvature radius Rs. In the case of the height equal to the curvature radius Rs of the inclined surface Sc, the inclined surface Sc is ¼ of the cylindrical surface. When the height exceeds the curvature radius Rs of the inclined surface Sc, the side surface Sw of the wall portion W has an extended surface extending above the inclined surface Sc. The extended surface may be perpendicular to the liquid film-forming surface. However, a configuration without the extended surface is also possible in the form that the height exceeds the curvature radius Rs, as in FIG. 13C and FIG. 13D.

Further, from the viewpoint of reinforcing the main body portion, the thickness of the wall portion W and the distance between the wall portions W (which is almost equal to the width of the liquid film-forming surface) may be appropriately set such as to satisfy the reinforcement requirements. As the width of the liquid film-forming surface decreases, the minimized region is less likely to occur in the liquid film formed. Therefore, if the distance between the wall portions W set based on the reinforcement requirements is small, it is not necessary to specify the inclination angle θ and the curvature radius Rs of the inclined surface as the optimum value.

Based on the design of the inclined surface Sp, Sc as described above, it is possible to manufacture a packing element, using a rectangular flat plate material. For example, as shown in FIG. 3 or FIG. 4, a packing element 10 or a packing element 20 having a pair of wall portions at both side ends of the liquid film-forming surface is obtained. In a flow channel in which the cross section perpendicular to the flow direction is roughly rectangular such that the distance between the wall portions (substantially equal to the width of the liquid film-forming surface) is set to be twice or more the height of the wall portion, it is possible to suitably form a liquid film extending in the liquid flowing direction without converging the liquid flowing on the liquid film-forming surface. Therefore, the liquid and the gas are in good contact with each other. Practically, it is possible to achieve both efficient gas-liquid contact with suitable liquid-film formation and securing of the strength of the packing element, by constructing the flow channel of thin layer in which the distance between the wall portions is about 5 to 1,000 times, particularly about 10 to 100 times the height of the wall portions. With such a configuration, the gas-liquid contact area per volume can be set to be large, and it is thus possible to efficiently perform large capacity processing while suppressing pressure loss (i.e., increase in energy consumption) of gas. Therefore, it is advantageous in application to a large-sized gas-liquid contact apparatus.

In this manner, the influence by the wall portion on the formation of the liquid film is suppressed by designing the packing element to have a suitable inclined surface at the boundary between the side surface of the wall portion and the liquid film-forming surface. Thus, a packing element is provided in which the liquid film is formed in a satisfactory state. The main body portion is reinforced by providing the wall portion standing with respect to the planar liquid film-forming surface. When assembling the packing by arranging a number of packing elements in parallel, the wall portion also functions as a spacer, so that the assembling work is easy. Therefore, deformation and distortion of the packing at the time of gas-liquid contact treatment can be suppressed while weight reduction can be achieved. Thus, it is possible to reduce the weight of the apparatus to which the packing is applied. In addition, it is possible to reduce the cost for manufacturing and processing the packing, which is economically very advantageous.

Utilizing the thin layer packing element as described above, it is possible to construct various columnar packing assemblies that are not limited to rectangular columnar or cylindrical packing assemblies but include polygonal columnar packing assemblies, elliptic cylindrical ones, and the like. In the packing elements for constituting a cylindrical packing, the shape of the main body B is a rectangle that corresponds respectively to parallel cross sections obtained by cutting the cylinder at equal intervals along the axial direction, and the lateral widths of the packing elements used are different. Lining up all the packing elements, the packing 1 is assembled, and it is loaded into a container 3 having an annular sidewall. When the positions of the wall portions are aligned so that the wall portions are contiguously straight in the state where the packing elements are juxtaposed, the strength of the packing as the whole can be obtained.

Examples of the gas G processed by the gas-liquid contact apparatus 2 using the packing 1 as described above include a waste gas (exhaust gas) and a reactant gas generated in a facility such as a chemical plant or a thermal power plant. An acid gas such as carbon dioxide, nitrogen oxides, sulfur oxides, and the like is frequently processed as the specific component. The liquid A to use as the absorbent is selected according to the specific component to be removed from the gas G. For recovery and removal of carbon dioxide, for example, an aqueous solution of an alkali agent such as cyclic amine compounds, alkanol-based amines, phenol-based amines, alkali metal salts, etc. is often used. An aqueous solution of an alkaline agent such as calcium compounds, magnesium compounds, etc. is generally used for removal of sulfur oxides. In an aqueous monoethanolamine (MEA) solution often used in recovery of carbon dioxide, the reaction with carbon dioxide produces carbamate salt/amine salt (carbamate), carbonate, bicarbonate and the like.

Therefore, each part constituting the gas-liquid contact apparatus 2 is made of a material having resistance to the components of the gas G and the chemical agents contained in the liquid A as described above. Examples of such a material include metals such as stainless steel, aluminum, nickel, titanium, carbon steel, brass, copper, monel metal, silver, tin, niobium, and resins such as polyethylene, polypropylene, PTFE, etc. Similarly, at least the surface of the packing 1 and the packing elements constituting the packing 1 is made of a corrosion-resistant material which does not cause reaction (corrosion) with the gas G to be treated and the liquid A to be used as described above. The surface of the material may be roughened by forming fine irregularities on the surface by means of surface finishing such as filing, sand blasting treatment, ultraviolet ozone treatment, plasma treatment and the like. In addition, the material may be one prepared to meet the above-described use conditions by modifying the surface by means of coating or the like. In the case of using a metal material, the packing element can be easily prepared by subjecting a flat plate or thin layer material having uniform thickness to groove processing or bending processing. In the case of making it from a resin material, it can be manufactured by applying heat in bending processing or introducing a molten resin into a mold and molding it. A mesh plate material such as a wire mesh using a metal wire, a punched metal plate, an expanded metal plate or the like is a plate material capable of reducing the weight while maintaining the strength to stand alone as a single body, and it exhibits excellent property also in wet spreading of liquid. Therefore, it is a preferable material as the packing. In the case where the mesh is extremely fine, the liquid film formed as an aggregate of serpentine flows approaches a layered state and it becomes possible to form a liquid film similar to that on the flat plate. Therefore, its application to the material constituting the packing elements, for example, as shown in FIG. 9 and FIG. 13 is allowable.

As can be understood from the above, according to the present disclosure, a packing is provided which is suitable for application to a gas purification apparatus, a gas separation apparatus, etc. that separates, removes or recovers a specific gas component such as acid gas and harmful gas from a gas to be treated such as exhaust gas and mixed gas. Moreover, a manufacturing method is proposed for a packing that exhibits excellent performance in gas-liquid contact between a gas to be treated and an absorbing liquid. Incidentally, application of the packing 1 according to the present disclosure is not limited to the gas-liquid contact apparatus for absorbing, separating or removing a specific component as described above. It is also applicable to apparatuses (a distillation column, a purification column, a stripping column (regeneration column) and the like) used in various chemical plants including a chemical process such as distillation, purification, and stripping.

In the structure of the packing element as described above, it is possible to prevent liquid film breakage when forming the liquid film with the supplied liquid. Therefore, the above-described structure is usable not only as a structure of a packing but also as a liquid film-forming structure for forming a liquid film using various liquids. If the liquid is immobilized by drying or solidification, a thin film of solid (including gel) is formed from the liquid film. Therefore, the liquid film-forming structure is applicable to a film forming technique. For example, it is usable in a coating technique of supplying a coating liquid and forming a coating film on a material surface. Specifically, an object to be coated is prepared such as to have a liquid film-forming structure in which a wall portion standing with respect to a flat liquid film-forming surface is provided with the side surface thereof having an inclined surface inclined at a predetermined angle as described above. Then the coating liquid is supplied to the liquid film-forming surface. As a result, the liquid film breakage of the coating liquid is suppressed, and the coating liquid satisfactorily wets and spreads on the flat liquid film-forming surface. Therefore, when fixing the liquid film by drying or solidifying the coating liquid, a coated object having a coating film formed on the liquid film-forming surface is obtained. The wall portion may be removed, optionally, from the coated object after forming the coating film. The liquid film-forming structure of the present disclosure is effective for suppressing the formation failure of the coating film and improving the uniformity of the coating film.

Accordingly, the present disclosure provides a liquid film-forming structure that forms a liquid film with a supplied liquid. That structure has a main body portion having a planar liquid film-forming surface and at least one wall portion provided to stand relative to the liquid film-forming surface. The wall portion has a side surface that has an inclined surface inclined at a predetermined angle to the liquid film-forming surface in the surface portion of the liquid film to be formed with the liquid on the liquid film-forming surface. The liquid film is suitably formed on the liquid film-forming surface, and the wall portion may be removed from the main body portion having the liquid film-forming surface, after forming the coating film, if necessary.

When applying the above-described liquid film-forming structure to a coating technique or the like, a structure in which the main body portion BV and the wall portions WV, WV' are separate from each other, for example, as shown in FIG. 12D, is possibly configured so that the wall portion can be freely attached to and detached from the main body portion. Therefore, it is useful for removing wall portions after liquid film formation. In other words, before the liquid supply, the main body portion and the wall portions are integrated by fitting and used as an object to be coated. Then After the formation of the liquid film, the wall portions can be removed to obtain a main body portion having a coating film on the surface. Further, since the structure using the thin plate as shown in FIG. 9 and FIG. 13 is relatively easy to perform post-processing, a plurality of main body portions may be separated from each other by cutting the wall portions after forming the liquid film. In this case, a main body portion having a wall piece is obtained. Modification of the wall portion may be possible to provide a notch for facilitating the cutting operation. It is also possible to provide the notch to cut at the base of the wall portion, thereby obtaining the main body portion having no wall portion. In this case, the notch is preferably formed on the surface opposite to the liquid film-forming surface.

In the above-described liquid film-forming structure, various films or thin layers can be formed using a liquid containing an organic or inorganic material. For example, it can be applied to the production of a resin film using a resin solution, the production of a gel film using an organic or inorganic sol liquid, and the like. When applying the liquid film-forming structure as shown in FIG. 7 to FIG. 13 to a pallet for forming a thin film, and supplying a resin solution or a sol liquid to the pallet, efficient manufacture of a large number of thin films having a predetermined size and shape is possible. Suppression of liquid film breakage is useful for increasing uniformity when forming a relatively large-sized thin film, and can contribute to improvement in manufacturing efficiency.

EXAMPLES

<Preparation of Samples S1, S2>

A flat plate material made of stainless steel (SUS304) having a length of 60 mm was prepared, and a flow channel having a rectangular cross section (lateral width <50 mm, depth <5 mm) was formed along the longitudinal direction of the flat plate material. This work was carried out by scraping by electric discharge machining and finishing with an end mil having a diameter of 20 mm. Further, using the end mill, processing was applied to the bottom surface and the side surfaces of the flow channel. Thereby, it was finish into a shape having a lateral width of 50 mm and a depth of 5 mm and having a flat surface inclined at an inclination angle $\theta$ (exterior angle with respect to the bottom surface) of 20° (Sample S1) or 25° (Sample S2) on both sides of the bottom surface of the flow channel. It was used as a packing element of Sample S1 or Sample S2 in the following measurement.

<Preparation of Reference Samples C1, C2>

A flat plate material made of stainless steel (SUS304) having a length of 60 mm was prepared, and a flow channel having a rectangular cross section (lateral width <50 mm, depth <5 mm) was formed along the longitudinal direction of the flat plate material. This work was carried out by scraping by electric discharge machining and finishing with an end mil having a diameter of 20 mm. Further, selecting and using a radius end mill with an appropriate curvature at the tip, processing was applied to the bottom surface and the side surfaces of the flow channel. Thereby, it was finish into a shape having a lateral width of 50 mm and a depth of 5 mm and having a concave curved surface (curvature radius $Rs=6.0$ mm (Reference Sample C1) or 6.5 mm (Reference Sample C2)) curved in a shape of quadri-sectioned cylindrical surface on both sides of the bottom surface of the flow channel. It was used as a packing element of Reference Sample C1 or Reference Sample S2 in the following measurement.

<Liquid Film Formation Using Water>

The surface shape of the liquid film was measured as follows, using the packing element of Sample S1 prepared above, in which a flow channel having an inclined plane surface having an inclination angle $\theta$ of 20°.

The flat plate material was placed so that the angle $\beta$ of the flat plate material with respect to the horizontal plane was 60°, and water (20° C., Weber number We=0.8) was supplied as a liquid to the flow channel at a predetermined flow rate to flow on the bottom surface (liquid film-forming surface) of the flow channel. Whereby the liquid film was formed. The supply of water was performed uniformly so that the supply amount per unit in the width direction of the flow channel was the same.

Figure 15A:
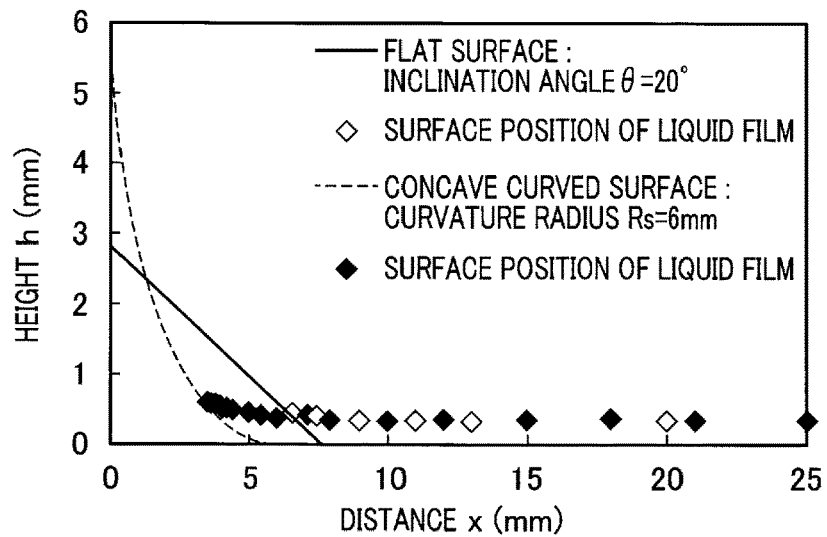
FIG. 15A to FIG. 15C are graphs prepared based on experimental measurement and each illustrating a surface shape of the liquid film formed on the packing element having an inclined surface (vertical axis: liquid film height h (mm), horizontal axis: distance x (mm) from the side edge of flow channel).

According to the stylus method using a needle probe (outer diameter of the stylus=0.5 mm, stylus angle $\psi=10°$ with respect to the vertical direction), the surface of the liquid film at a position of 30 mm downstream from the supply port of the flow channel was measured along the width direction of the flow channel. From the results of measurement, the liquid film height was determined as the position of the liquid film surface with reference to the liquid film-forming surface. By plotting the relationship between the distance x from the side end of the flow channel and the liquid film height h, the surface shape as shown in FIG. 15A was obtained.

Moreover, the same measurement of the surface shape of the liquid film was performed using the packing element manufactured as Reference Sample C1 instead of the packing element of Sample S1. The result is shown together in FIG. 15A.

<Measurement of Critical Weber Number $We_c$>

The packing element was installed in the similar manner to the measurement of the shape of the liquid film surface, and water was supplied to the flow channel while the flow rate was gradually increased. As a result, the liquid film formed on the bottom surface of the flow channel expanded, and the flow rate of water when the dry out region disappeared and the liquid film was formed on the entire bottom surface of the flow channel was determined. Using this, the critical Weber number $We_c$ was calculated from the formula (4). The value in the packing element of Sample S1 was 0.58, and the value in the packing element of Reference sample C1 was 0.51.

<Liquid Film Formation Using Aqueous Ethanol Solution>

Figure 15B:
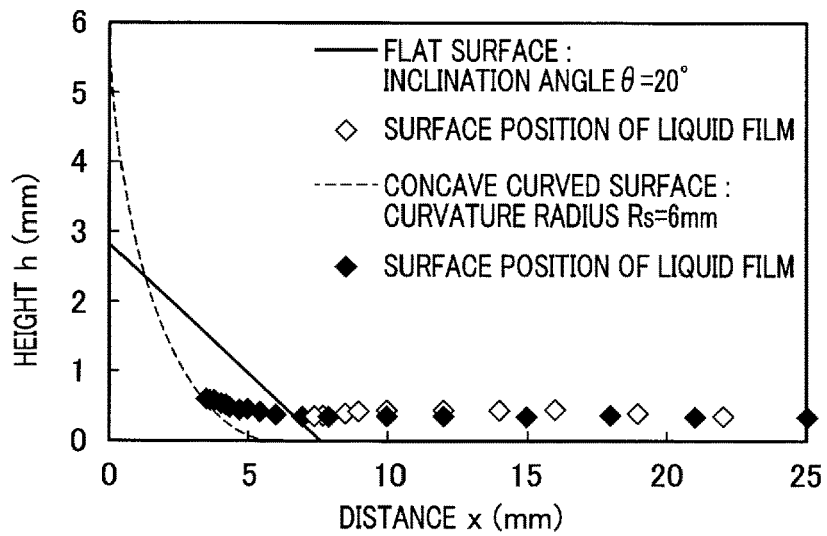

The measurement of the shape of the liquid film surface described above was repeated in the same manner as above, except that the liquid to be supplied to the flow channel was replaced with an aqueous solution having an ethanol concentration (mass value) of 20% (20° C., Weber number We=0.8). As a result, the graph showing the relationship between the distance x from the side end of the flow channel and the liquid film height h depicted a surface shape as shown in FIG. 15B. Moreover, the value of critical Weber number $We_c$ was 0.29.

Further, using the packing element prepared as Reference Sample C1 instead of the packing element of Sample S1, the surface shape of the liquid film by the aqueous ethanol solution was measure similarly. The result is shown together in FIG. 15B. The value obtained in the measurement of the critical Weber number was 0.21.

<Liquid Film Formation Using Glycerol Aqueous Solution>

Figure 15C:
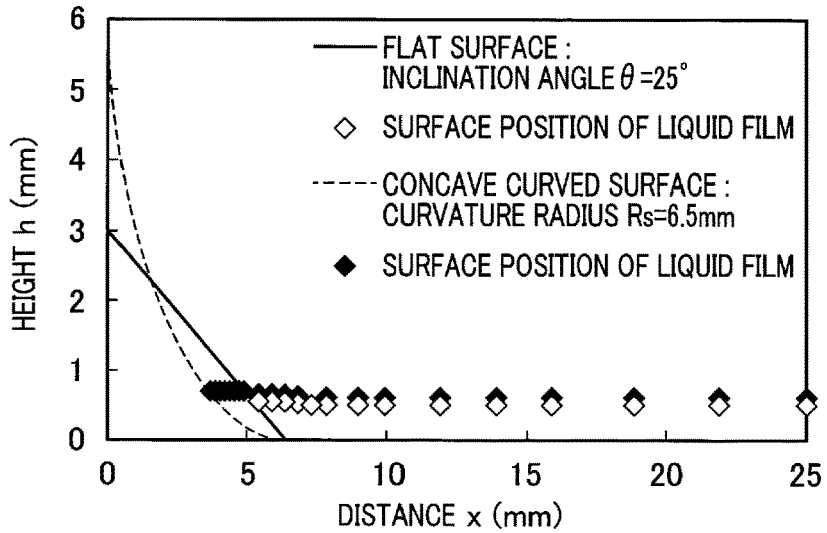

The measurement of the shape of the liquid film surface described above was performed in the same manner as above, except that the used packing element was changed from Sample S1 to Sample S2 (inclination angle θ=25°) and the liquid to be supplied to the flow channel was replaced with an aqueous solution having a glycerol concentration (mass value) of 60% (20° C., Weber number We=0.8). As a result, a graph showing the relationship between the distance x from the side end of the flow channel and the liquid film height h depicted the surface shape as shown in FIG. 15C. Moreover, the value of critical Weber number $We_c$ was 0.06.

Further, using the packing element prepared as Reference Sample C2 instead of the packing element of Sample S2, the surface shape of the liquid film with the glycerol aqueous solution was measured similarly. The result is shown together in FIG. 15C. The value obtained in the measurement of the critical Weber number $We_c$ was 0.09.

<Evaluation of Measurement Results>

For the critical Weber number $We_c$, the values obtained based on the above measurement are shown together with the theoretical values and the values when the side surface is a plane surface perpendicular to the liquid film-forming surface, which are as shown in Table 1. According to Table 1, the critical Weber number $We_c$ shows a value very close to the theoretical value in the state where the inclination angle θ of the inclined surface corresponds to the receding contact angle $θ_R$, and it is understood as being extremely small (about 11 to 25%) as compared with the case where the side surface is perpendicular. Then, there is almost no difference even when comparing with a packing element formed with a concave curved surface which is very effective for suppressing liquid film breakage. Rather, it can be said as more effective in the case of using a 60% glycerol aqueous solution. In the packing elements of Sample S1 and sample S2, the inclination angle θ of the inclined plane surface has been set based on the fact that the measured value of the receding contact angle $θ_R$ of the liquid with respect to the side surface of the wall portion was, respectively, about 20° (water and 20% ethanol aqueous solution) and about 25° (60% glycerol aqueous solution). The results in Table 1 confirm that this setting is valid. As described above, the value of the critical Weber number $We_c$ greatly changes depending on the shape of the side surface.

TABLE 1

| Liquid | Receding contact angle $θ_R$ | Inclined plane surface | | Concave curved surface | | Theoretical value $We_c$ | Perpendicular surface $We_c$ |
| --- | --- | --- | --- | --- | --- | --- | --- |
| | | Inclination angle θ | $We_c$ | Curvature radius Rs | $We_c$ | | |
| Water | 20° | 20° | 0.58 | 6.0 mm | 0.51 | 0.35 | 4.0 |
| 20% Ethanol | 20° | 20° | 0.29 | 6.0 mm | 0.21 | 0.14 | 1.2 |
| 60% Glycerol | 25° | 25° | 0.06 | 6.5 mm | 0.09 | 0.09 | 0.09 |

Moreover, according to FIG. 15A to FIG. 15C, it is understood that, in a packing element having an inclined plane surface whose inclination angle θ corresponds to the receding contact angle $θ_R$ of the liquid, the liquid film has a substantially flat surface shape with almost no minimized region Rt on the surface. This point is common to all liquids to use, and it is the same as the surface shape of the liquid film in the packing element having a concave curved surface. Therefore, it is apparent that, by adjusting the inclination angle θ of the inclined surface provided on the side surface of the wall portion in accordance with the receding contact angle $θ_R$ formed by the liquid used, liquid film breakage can be suppressed and the wetness of the liquid film-forming surface can be ensured. The inclined surface provided on the side surface is not limited to a flat surface, and may be a convex curved surface, as long as the inclined angle at the surface position of the liquid film corresponds to the receding contact angle $θ_R$. The value of the critical Weber number $We_c$ in such a state approaches the theoretical value. As the value of the critical Weber number $We_c$ becomes smaller, a meniscus is less likely to occur and the liquid film breakage is suppressed.

Although the embodiments of the present disclosure have been described above with reference to the accompanying drawings, the present disclosure is not limited to such embodiments. Moreover, it must be understood that various changes or modifications that can be conceived by those skilled in the art are naturally also within the technical scope of the present disclosure, in the scope described in the claims.

A gas-liquid contact apparatus with good energy efficiency at the time of operation is provided and good gas-liquid contact and efficient component transfer can be realized while suppressing pressure loss. Therefore, it is possible to contribute to improvement of efficiency in chemical treatment and manufacturing processing, prevention of environmental pollution by popularization of treatment of exhaust gas such as combustion gas and the like, with generalization based on economic improvement. Moreover, it is also possible to contribute to effective use of resources by reducing the weight of the apparatus and reducing manufacturing and processing cost. Furthermore, it can contribute to improvement of manufacturing efficiency in various film formations such as painting and thin film formation.

What is claimed is:

1. A packing for gas-liquid contact, having at least one packing element of a thin layer shape that is placed in a standing position, the packing element of the thin layer shape comprising:
   a main body portion having a planar liquid film-forming surface extending along a liquid flow direction; and
   a wall portion that is provided to stand relative to the liquid film-forming surface and extending along the liquid flow direction,
   wherein the wall portion has a side surface which has an inclined surface inclined at a predetermined angle to the liquid film-forming surface in a surface position of a liquid film to be formed by a liquid on the liquid film-forming surface, and
   wherein the predetermined angle is an angle in a range including a receding contact angle to be formed by the liquid to the side surface.

2. The packing according to claim 1, wherein the inclined surface is a convex curved surface or an inclined plane surface, and the side surface of the wall portion is discontinuous with the liquid film-forming surface.

3. The packing according to claim 1, wherein the inclined surface is inclined at the predetermined angle such that a critical Weber number in the liquid film to be formed by the liquid on the liquid film-forming surface is a value of 1 to 10 times a theoretical value.

4. The packing according to claim 1, wherein the predetermined angle is 0.8 to 3.0 times the receding contact angle to be formed by the liquid to the side surface.

5. The packing according to claim 1, wherein the inclined surface is a convex curved surface that includes a partial surface of one selected from cylindrical surfaces, oval cylindrical surfaces and elliptic cylindrical surfaces.

6. The packing according to claim 5, wherein the convex curved surface includes a partial cylindrical surface, and, at a curvature radius of the cylindrical surface, a critical Weber number in the liquid film to be formed by the liquid on the liquid film-forming surface is a value of 1 to 10 times a theoretical value.

7. The packing according to claim 1, wherein, with reference to the liquid film-forming surface, the wall portion has a height exceeding a surface of the liquid film to be formed by the liquid.

8. The packing according to claim 1, wherein the packing element has a pair of the wall portions, and the pair of the wall portions extend at both side ends of the liquid film-forming surface.

9. The packing according to claim 1, wherein the predetermined angle is equal to the receding contact angle to be formed by the liquid to the side surface.

10. The packing according to claim 6, wherein the curvature radius of the cylindrical surface is 0.3 to 50 mm.

11. A method for manufacturing a packing having at least one packing element of a thin layer shape that is to be used by placing in a standing position, comprising:
    a designing step of designing a packing element of the thin layer shape comprising: a main body portion having a planar liquid film-forming surface; and a wall portion that is provided to stand relative to the liquid film-forming surface along a straight line, wherein the wall portion is designed to have a side surface which has an inclined surface inclined at a predetermined angle to the liquid film-forming surface in a surface position of a liquid film to be formed by a liquid on the liquid film-forming surface, and the predetermined angle is an angle in a range including a receding contact angle to be formed by the liquid to the side surface; and
    a fabricating step of fabricating the designed packing element of the thin layer shape, using a raw material.

12. The manufacturing method for the packing according to claim 11, wherein, in the designing step, the inclined surface is designed to be a convex curved surface or an inclined plane surface, and further comprising:
    a determination step of determining the predetermined angle at which the inclined surface is inclined, in a range of 0.8 to 3.0 times the receding contact angle to be formed by the liquid to the side surface,
    wherein the predetermined angle determined in the determination step is applied to the packing element designed in the designing step.

13. The manufacturing method for the packing according to claim 11, wherein, in the designing step, the inclined surface is designed to be a convex curved surface that includes a partial surface of one selected from cylindrical surfaces, oval cylindrical surfaces and elliptic cylindrical surfaces.

14. The manufacturing method for the packing according to claim 13, wherein the convex curved surface in the designing step is a partial cylindrical surface, and further comprising:
    a determination step of determining a curvature radius of the convex curved surface, according to an angle of the liquid film-forming surface with respect to a horizontal plane in use of the packing, physical properties of a liquid to be used, and characteristics related to contact of the liquid with the packing element,
    wherein the curvature radius is determined to such a value at which a critical Weber number in the liquid film to be formed by the liquid on the liquid film-forming surface is a value of 1 to 10 times a theoretical value, and the determined value of the curvature radius is applied to the packing element designed in the designing step.

15. A liquid film-forming structure for forming a liquid film by a liquid to be supplied, comprising:
    a main body portion having a planar liquid film-forming surface; and
    a wall portion that is provided to stand relative to the liquid film-forming surface, wherein the wall portion has a side surface which has an inclined surface inclined at a predetermined angle to the liquid film-forming surface in a surface position of the liquid film to be formed by the liquid on the liquid film-forming surface, and wherein the predetermined angle is an angle in a range including a receding contact angle to be formed by the liquid to the side surface.

16. The liquid film-forming structure according to claim 15, wherein the inclined surface is a convex curved surface or an inclined plane surface, and the side surface of the wall portion is discontinuous with the liquid film-forming surface.

17. The liquid film-forming structure according to claim 15, wherein the inclined surface is inclined at the predetermined angle such that a critical Weber number in the liquid film to be formed by the liquid on the liquid film-forming surface is a value of 1 to 10 times a theoretical value.

18. The liquid film-forming structure according to claim 15, wherein the predetermined angle is 0.8 to 3.0 times the receding contact angle to be formed by the liquid to the side surface.

19. The liquid film-forming structure according to claim 15, wherein the inclined surface is a convex curved surface that includes a partial surface of one selected from cylindrical surfaces, oval cylindrical surfaces and elliptic cylindrical surfaces.

20. The liquid film-forming structure according to claim 19, wherein the convex curved surface includes a partial cylindrical surface, and, at a curvature radius of the cylindrical surface, a critical Weber number in the liquid film to be formed by the liquid on the liquid film-forming surface is a value of 1 to 10 times a theoretical value.

* * * * *